United States Patent
Mizuno

(10) Patent No.: US 10,589,539 B2
(45) Date of Patent: Mar. 17, 2020

(54) IMAGE PROCESSING APPARATUS, IMAGE PROCESSING METHOD, PROGRAM, AND INK JET PRINTING SYSTEM

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/234,615

(22) Filed: Dec. 28, 2018

(65) Prior Publication Data

US 2019/0126634 A1 May 2, 2019

Related U.S. Application Data

(63) Continuation of application No. PCT/JP2017/022892, filed on Jun. 21, 2017.

(30) Foreign Application Priority Data

Jul. 11, 2016 (JP) .................. 2016-136923

(51) Int. Cl.
*B41J 2/21* (2006.01)
*G06K 15/10* (2006.01)
(Continued)

(52) U.S. Cl.
CPC ............... *B41J 2/2132* (2013.01); *B41J 2/01* (2013.01); *B41J 2/52* (2013.01); *B41J 3/4078* (2013.01);
(Continued)

(58) Field of Classification Search
CPC ..... B41J 2/2132; B41J 2/52; B41J 2/01; B41J 11/008; B41J 3/4078; G06K 15/102;
(Continued)

(56) References Cited

U.S. PATENT DOCUMENTS

| 5,867,197 A | 2/1999 | Aoki |
| 6,116,728 A | 9/2000 | Miyake et al. |

(Continued)

FOREIGN PATENT DOCUMENTS

| EP | 0962318 | 12/1999 |
| JP | H07101052 | 4/1995 |

(Continued)

OTHER PUBLICATIONS

"Written Opinion of the International Searching Authority (Form PCT/ISA/237) of PCT/JP2017/022892," dated Aug. 22, 2017, with English translation thereof, pp. 1-7.

(Continued)

*Primary Examiner* — Allen H Nguyen
(74) *Attorney, Agent, or Firm* — JCIPRNET

(57) ABSTRACT

Provided are an image processing apparatus, an image processing method, a program, and an ink jet printing system that can perform image formation capable of preventing the deterioration of image quality caused by bleeding in a case in which printing is performed on cloth. An image processing apparatus 12 acquires base material information 42 including at least information indicating the quality of fiber in cloth which is a medium to be printed and image data 40 to be printed on the cloth and generates a bleeding-prevented image 44 indicating an ink application pattern in which at least one of an ink application position or an amount of ink applied is limited in anticipation of wetting and spreading of the ink in the cloth, on the basis of the base material information 42 and the image data 40.

15 Claims, 28 Drawing Sheets

(51) Int. Cl.
  *G06K 15/00* (2006.01)
  *G06K 15/02* (2006.01)
  *B41J 2/52* (2006.01)
  *B41J 2/01* (2006.01)
  *B41J 11/00* (2006.01)
  *B41J 3/407* (2006.01)
  *B41M 5/00* (2006.01)

(52) U.S. Cl.
  CPC .............. *B41J 11/008* (2013.01); *B41M 5/00* (2013.01); *G06K 15/002* (2013.01); *G06K 15/021* (2013.01); *G06K 15/027* (2013.01); *G06K 15/102* (2013.01); *G06K 15/1881* (2013.01)

(58) Field of Classification Search
  CPC .............. G06K 15/1881; G06K 15/021; G06K 15/027; G06K 15/002; B41M 5/00
  USPC .......................................................... 358/1.6
  See application file for complete search history.

(56) References Cited

U.S. PATENT DOCUMENTS

| | | | |
|---|---|---|---|
| 6,153,263 A | 11/2000 | Haruta et al. | |
| 6,705,717 B1* | 3/2004 | Fujita | B41J 2/14024 347/100 |
| 9,440,455 B2 | 9/2016 | Sayama et al. | |
| 2001/0050702 A1* | 12/2001 | Ohsawa | B41C 1/1066 347/55 |
| 2002/0054992 A1* | 5/2002 | Sato | B41J 3/4078 428/327 |
| 2007/0126833 A1 | 6/2007 | Laurin et al. | |
| 2010/0196603 A1* | 8/2010 | Ohshima | B41M 5/5218 427/288 |
| 2010/0214351 A1* | 8/2010 | Koike | B41M 5/0023 347/21 |
| 2010/0231631 A1* | 9/2010 | Hosaka | B41J 2/14274 347/15 |
| 2012/0044312 A1* | 2/2012 | Hirst | B41J 2/0057 347/172 |
| 2015/0251446 A1 | 9/2015 | Sayama et al. | |

FOREIGN PATENT DOCUMENTS

| | | |
|---|---|---|
| JP | H0835182 | 2/1996 |
| JP | H09296380 | 11/1997 |
| JP | 2000345463 | 12/2000 |
| JP | 2005232633 | 9/2005 |
| JP | 201137228 | 2/2011 |
| JP | 2015168149 | 9/2015 |

OTHER PUBLICATIONS

"International Search Report (Form PCT/ISA/210) of PCT/JP2017/022892," dated Aug. 22, 2017, with English translation thereof, pp. 1-5.

"Search Report of Europe Counterpart Application", dated Jun. 26, 2019, pp. 1-8.

"Office Action of Japan Counterpart Application," with machine English translation thereof, dated Aug. 2, 2019, pp. 1-10.

"Office Action of Japan Counterpart Application," with English translation thereof, dated Dec. 4, 2019, pp. 1-10.

* cited by examiner

COTTON, PLATE WEAVE (HORIZONTAL)

COTTON, PLATE WEAVE (VERTICAL)

FIG. 15

50A: LATERAL FILTER

| 0 | 0 | 0 | 0 | 0 |
|---|---|---|---|---|
| 0 | 0 | 0 | 0 | 0 |
| 0 | 0.5 | 0 | −0.5 | 0 |
| 0 | 0 | 0 | 0 | 0 |
| 0 | 0 | 0 | 0 | 0 |

FIG. 16

50B: LONGITUDINAL FILTER

| 0 | 0 | −0.5 | 0 | 0 |
|---|---|---|---|---|
| 0 | 0 | −1.0 | 0 | 0 |
| 0 | 0 | 0 | 0 | 0 |
| 0 | 0 | 1.0 | 0 | 0 |
| 0 | 0 | 0.5 | 0 | 0 |

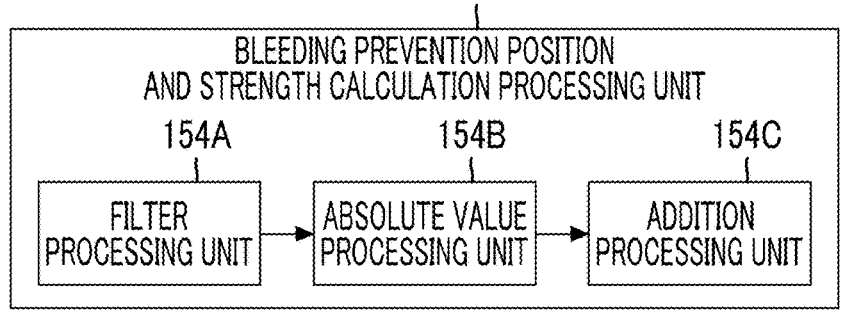
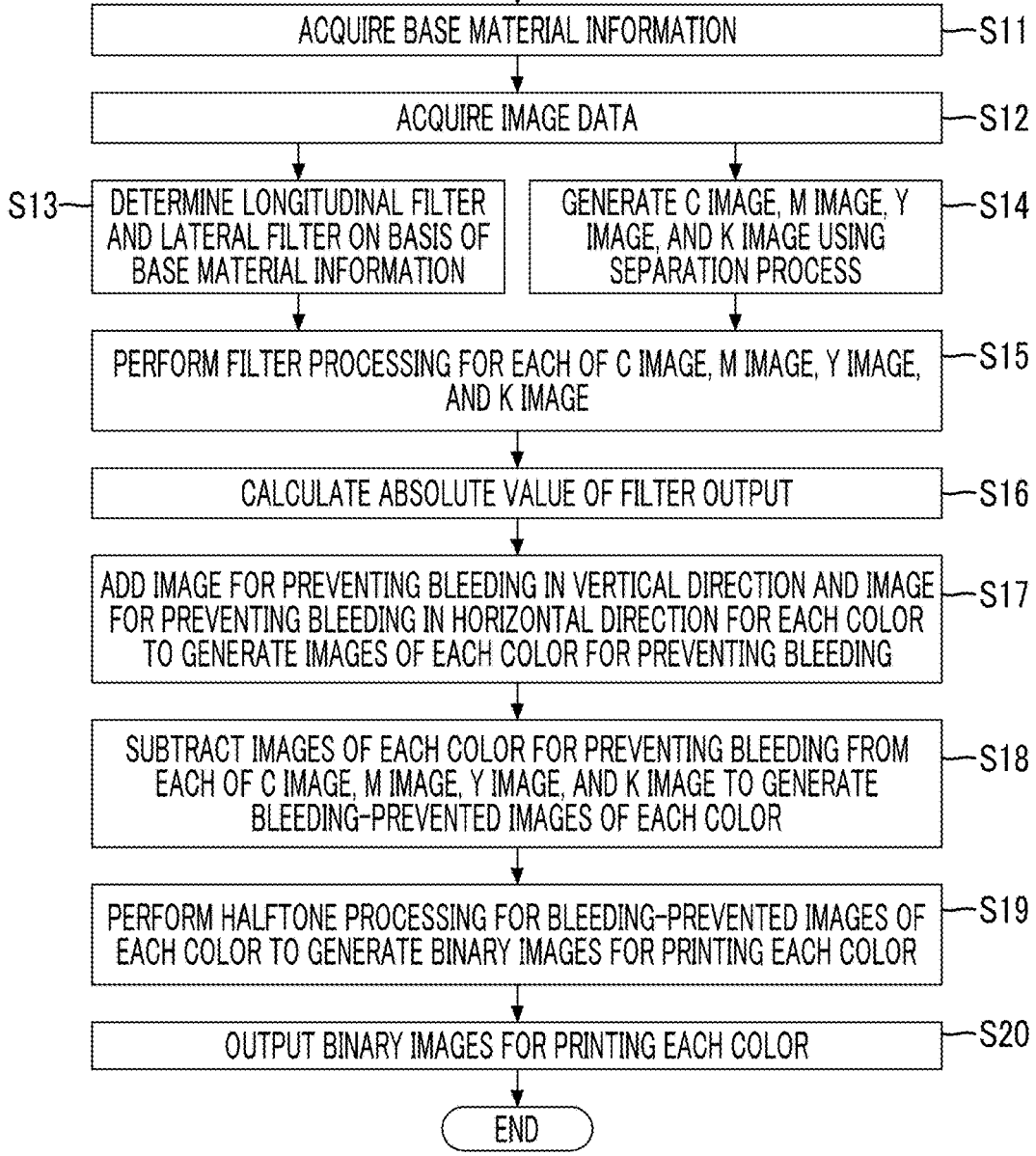

FIG. 39

LATERAL FILTER

| 0 | 0 | 0 | 0 | 0 |
|---|---|---|---|---|
| 0 | 0 | 0 | 0 | 0 |
| 0 | −0.5 | 0 | 0.5 | 0 |
| 0 | 0 | 0 | 0 | 0 |
| 0 | 0 | 0 | 0 | 0 | ent
IMAGE PROCESSING APPARATUS, IMAGE PROCESSING METHOD, PROGRAM, AND INK JET PRINTING SYSTEM

CROSS-REFERENCE TO RELATED APPLICATIONS

The present application is a Continuation of PCT International Application No. PCT/JP2017/022892 filed on Jun. 21, 2017 claiming priority under 35 U.S.C § 119(a) to Japanese Patent Application No. 2016-136923 filed on Jul. 11, 2016. Each of the above applications is hereby expressly incorporated by reference, in their entirety, into the present application.

BACKGROUND OF THE INVENTION

1. Field of the Invention

The present invention relates to an image processing apparatus, an image processing method, a program, and an ink jet printing system, and more particularly, to an image formation technique suitable for ink jet printing.

2. Description of the Related Art

In recent years, printing on cloth has been changed from a so-called analog printing method using screen printing to a digital printing method using ink jet printing. This is due to the evaluation of the advantages of the digital printing method over the analog printing method according to the related art, such as flexibility in the design of a print pattern and adaptability to the printing of a small number of copies which are the characteristics of the digital printing method. Analog printing can obtain a higher-quality image than ink jet printing in term of preventing bleeding.

While printing ink containing a printing paste for preventing bleeding can be used in analog printing, ink jetting stability is important in ink jet printing. For this reason, it is difficult to use printing ink with high viscosity in ink jet printing. Ink for ink jet printing has a lower viscosity than ink for analog printing and is easy to penetrate into cloth. As a result, bleeding is likely to occur. A printing method has been proposed which uses a pretreatment liquid or pigment ink in order to prevent the deterioration of image quality caused by bleeding in ink jet printing (see JP2011-37228A and JP1996-035182A (JP-H08-035182A)) and there are attempts to preventing bleeding.

SUMMARY OF THE INVENTION

However, there is a problem that the texture of cloth after printing deteriorates due to the influence of the pretreatment liquid or pigment ink for preventing bleeding. The texture refers to the feeling and texture of a material. In a case in which bleeding is prevented in order to attach importance to image quality, texture deteriorates. In a case in which importance is attached to texture, it is difficult to sufficiently prevent bleeding and image quality deteriorates. The texture and the prevention of bleeding have a trade-off relationship therebetween and it is difficult to improve the texture and the prevention of bleeding to a sufficiently high level. In particular, the bleeding of ink, that is, the wetting and spreading of ink varies depending on the type of cloth. It is difficult to improve both texture and image quality for various types of cloth.

It is desirable to reduce the use of the pretreatment liquid in order to maintain the texture and it is more desirable not to use the pretreatment liquid. The reduction in the use of the pretreatment liquid means a reduction in the amount of pretreatment liquid applied to cloth and the non-use of the pretreatment liquid is included in the concept of "reducing the use of the pretreatment liquid".

The invention has been made in view of the above-mentioned problems and an object of the invention is to provide an image processing apparatus, an image processing method, a program, and an ink jet printing system that can perform image formation capable of preventing the deterioration of image quality caused by bleeding even in a case in which the use of a pretreatment liquid is reduced.

The following aspects of the invention are provided as means for solving the problems.

According to a first aspect, there is provided an image processing apparatus comprising: base material information acquisition means for acquiring base material information including at least information indicating a quality of fiber in cloth which is a medium to be printed; image acquisition means for acquiring image data to be printed on the cloth; and bleeding prevention image processing means for generating a bleeding-prevented image indicating an ink application pattern in which at least one of an ink application position or an amount of ink applied is limited in anticipation of wetting and spreading of the ink in the cloth, on the basis of the base material information and the image data.

According to the first aspect, it is possible to generate the bleeding-prevented image on the basis of the base material information, considering the wetting and spreading of ink in each type of cloth. The bleeding-prevented image is image information in which at least one of the ink application position or the amount of ink applied is limited, as compared to the original image data. The application of the ink to the cloth is controlled on the basis of the bleeding-prevented image. As a result, it is possible to reproduce well the pattern of the image data to be printed on the cloth, with the wetting and spreading of the ink in the cloth after the ink is applied. According to the first aspect, it is possible to achieve printing capable of preventing the deterioration of image quality caused by bleeding, without using a pretreatment liquid.

According to a second aspect, in the image processing apparatus according to the first aspect, the base material information may include yarn type information for specifying a quality of warp and weft as the information indicating the quality of the fiber.

According to a third aspect, in the image processing apparatus according to the first or second aspect, the base material information may include weave type information indicating the type of weave and thickness information indicating a thickness of a yarn.

According to a fourth aspect, the image processing apparatus according to any one of the first to third aspects may further comprise: operation means for receiving an operation of inputting the base material information from a user; and display means for displaying the base material information.

According to a fifth aspect, in the image processing apparatus according to any one of the first to fourth aspects, the bleeding prevention image processing means may include: function determination means for determining a function used to calculate a bleeding prevention direction and a bleeding prevention range in which the application of the ink is limited on the basis of the base material information; and arithmetic processing means for applying the function determined by the function determination means to the image data to calculate a bleeding prevention position and bleeding prevention strength corresponding to the image data.

According to a sixth aspect, in the image processing apparatus according to the fifth aspect, the bleeding prevention image processing means may include difference processing means for calculating a difference between an image for preventing bleeding which indicates the bleeding prevention position and the bleeding prevention strength calculated by the arithmetic processing means and an original image indicated by the image data.

According to a seventh aspect, in the image processing apparatus according to the sixth aspect, the bleeding prevention image processing means may include separation processing means for performing a separation process of decomposing the image data into separated images which are images of each color component. The arithmetic processing means may generate the image for preventing bleeding which indicates the bleeding prevention position and bleeding prevention strength corresponding to the separated images by applying the function determined by the function determination means to the separated images to convert the separated images. The difference processing means may calculate a difference between the separated images as the original image and the image for preventing bleeding to generate the bleeding-prevented image.

According to an eighth aspect, in the image processing apparatus according to any one of the fifth to seventh aspects, wetting and spreading information indicating wetting and spreading characteristics of the ink in each of a plurality of types of cloth may be stored for the plurality of types of cloth in advance and the function determination means may determine the function using the wetting and spreading information corresponding to the base material information.

According to a ninth aspect, in the image processing apparatus according to the eighth aspect, the wetting and spreading information may include information indicating a wetting and spreading direction and a wetting and spreading range.

According to a tenth aspect, the image processing apparatus according to the eighth or ninth aspect may further comprise function database storage means for storing, as the wetting and spreading information, data of the function corresponding to the wetting and spreading characteristics of the ink in each of a plurality of types of cloth for the plurality of types of cloth in advance. The function determination means may determine the function corresponding to the base material information, using the data stored in the function database storage means.

According to an eleventh aspect, in the image processing apparatus according to any one of the fifth to tenth aspects, the function determination means may generate an edge enhancement filter having direction dependence as the function.

According to a twelfth aspect, in the image processing apparatus according to the eleventh aspect, the function determination means may generate, as the function, a first direction filter which is an edge enhancement filter acting in an image direction parallel to a first direction and a second direction filter which is an edge enhancement filter acting in an image direction parallel to a second direction that is perpendicular to the first direction.

For example, the first direction may be a warp direction and the second direction may be a weft direction.

According to a thirteenth aspect, in the image processing apparatus according to the twelfth aspect, the arithmetic processing means may include: filter processing means for performing filter processing using the function determined by the function determination means; absolute value processing means for performing absolute value processing for calculating an absolute value of an image signal value obtained by the filter processing; and addition processing means for adding an image for preventing bleeding in the first direction which is generated by performing the absolute value processing for a result of the filter processing using the first direction filter and an image for preventing bleeding in the second direction which is generated by performing the absolute value processing for a result of the filter processing using the second direction filter.

According to a fourteenth aspect, the image processing apparatus according to any one of the first to thirteenth aspects may further comprise halftone processing means for generating a dot pattern image which defines the ink application position and the amount of ink applied from the bleeding-prevented image.

According to a fifteenth aspect, there is provided an ink jet printing system comprising: the image processing apparatus according to any one of the first to fourteenth aspects; ink jetting means for jetting the ink and applying the ink to the ink application position determined from the bleeding-prevented image in the cloth; and control means for controlling the ink jetting means.

According to a sixteenth aspect, there is provided an image processing method comprising: a base material information acquisition step of acquiring base material information including at least information indicating a quality of fiber in cloth which is a medium to be printed; an image acquisition step of acquiring image data to be printed on the cloth; and a bleeding prevention image processing step of generating a bleeding-prevented image indicating an ink application pattern in which at least one of an ink application position or an amount of ink applied is limited in anticipation of wetting and spreading of the ink in the cloth, on the basis of the base material information and the image data.

In the sixteenth aspect, the same matters as those specified by the second to fourteenth aspects can be appropriately combined with each other. In this case, elements of the means or functions specified in the image processing apparatus can be understood as elements of the steps of the processes or operations corresponding to the elements.

According to a seventeenth aspect, there is provided a program that causes a computer to function as: base material information acquisition means for acquiring base material information including at least information indicating a quality of fiber in cloth which is a medium to be printed; image acquisition means for acquiring image data to be printed on the cloth; and bleeding prevention image processing means for generating a bleeding-prevented image indicating an ink application pattern in which at least one of an ink application position or an amount of ink applied is limited in anticipation of wetting and spreading of the ink in the cloth, on the basis of the base material information and the image data.

In the seventeenth aspect, the same matters as those specified by the second to fourteenth aspects can be appropriately combined with each other. In this case, the elements of the means or functions specified in the image processing apparatus can be understood as elements of a program for implementing means or functions corresponding to the elements.

According to the invention, it is possible to generate the bleeding-prevented image obtained by processing and correcting image data in anticipation of the wetting and spreading of in ink after printing, according to the wetting and spreading characteristics of the ink for each type of cloth. Since the application of ink to the cloth is controlled on the basis of the bleeding-prevented image, it is possible to achieve high-quality printing capable of preventing the deterioration of image quality caused by bleeding.

BRIEF DESCRIPTION OF THE DRAWINGS

FIG. 15 is a diagram illustrating an example of a longitudinal filter.

FIG. 16 is a diagram illustrating an example of a lateral filter.

FIG. 33 is a functional block diagram illustrating a bleeding prevention position and strength calculation processing unit.

FIG. 34 is a flowchart illustrating the flow of image processing by the image processing apparatus.

FIG. 39 is a diagram illustrating another example of the longitudinal filter.

DESCRIPTION OF THE PREFERRED EMBODIMENTS

Hereinafter, embodiments of the invention will be described with reference to the accompanying drawings.

[Outline of Ink Jet Printing System]

Figure 1:
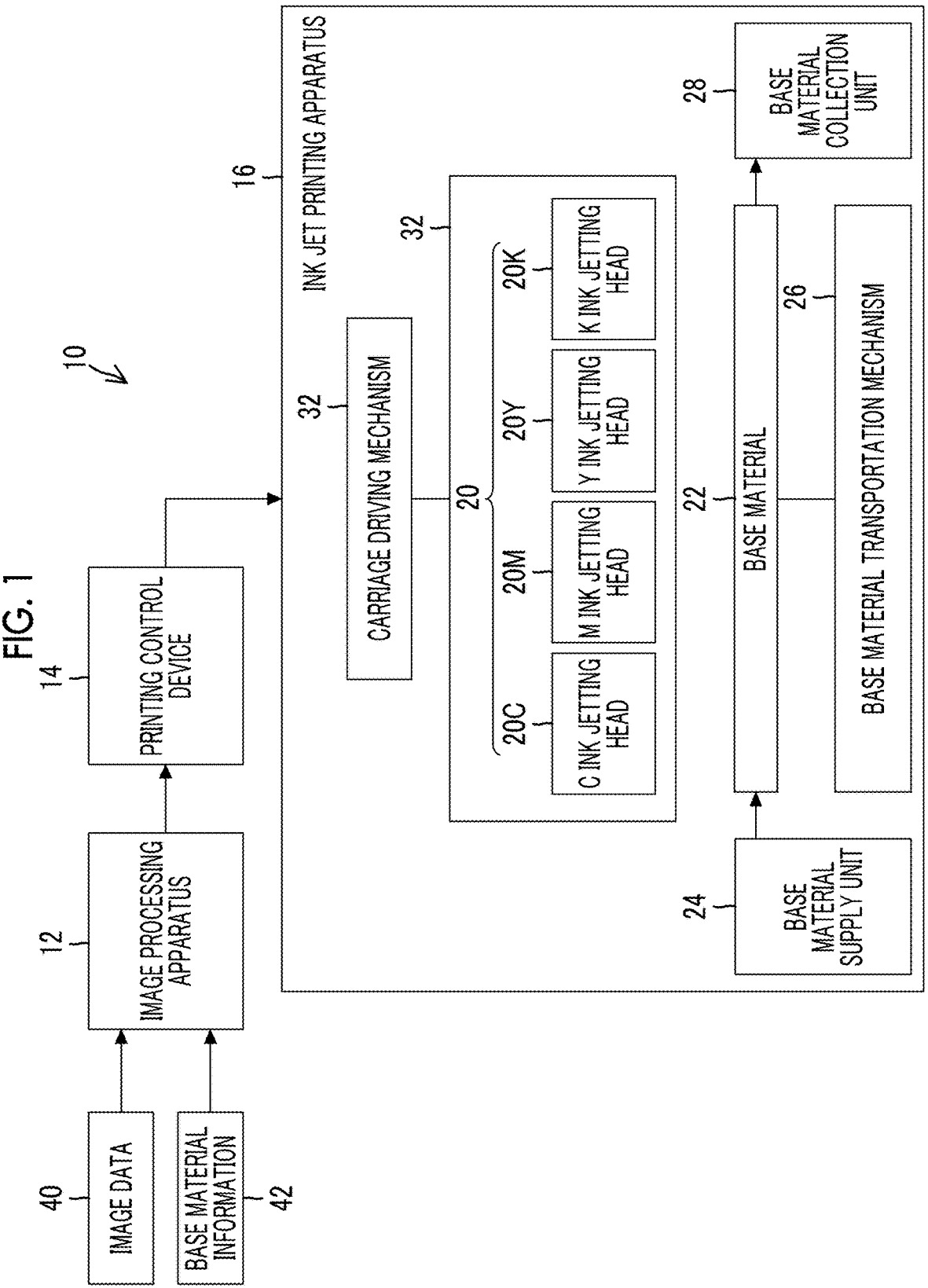
FIG. 1 is a block diagram schematically illustrating the configuration of an ink jet printing system according to an embodiment.

FIG. 1 is a block diagram schematically illustrating an example of the configuration of an ink jet printing system according to an embodiment. An ink jet printing system 10 includes an image processing apparatus 12, a printing control device 14, and an ink jet printing apparatus 16. The ink jet printing apparatus 16 comprises an ink jetting head 20, a base material supply unit 24 supplying a base material 22 which is a medium to be printed, a base material transportation mechanism 26, and a base material collection unit 28.

The base material 22 is cloth. The term "cloth" is synonymous with a textile base material or fabric. The concept of the term "cloth" includes woven fabrics, knitted fabrics, and non-woven fabrics. The base material 22 may be a continuous base material or a separate base material.

The ink jetting head 20 is an ink jet head that jets four color inks, that is, cyan, magenta, yellow, and black inks. In the specification, in some cases, the ink jet head is simply referred to as a "head". For a color notation, cyan is represented by "C", magenta is represented by "M", yellow is represented by "Y", and black is represented by "K". The ink jetting head 20 includes a C ink jetting head 20C that jets the cyan ink, an M ink jetting head 20M that jets the magenta ink, a Y ink jetting head 20Y that jets the yellow ink, and a K ink jetting head 20K that jets the black ink.

Each of the C, M, Y, and K heads forming the ink jetting head 20 has a jetting surface in which openings of a plurality of nozzles which are liquid jetting openings are arranged. The jetting surface is synonymous with a "nozzle surface". Each of the C, M, Y, and K heads forming the ink jetting head 20 are on-demand heads in which jetting energy generation elements are driven in response to a recording signal to jet liquid droplets from the nozzles. The jetting energy generation element is, for example, a piezoelectric element. A heating element may be used instead of the piezoelectric element. In addition, the piezoelectric element can obtain a stronger jetting force than the heating element. Therefore, it is preferable that a head which jets a liquid with a relatively high viscosity uses the piezoelectric element.

The ink jet printing apparatus 16 illustrated in FIG. 1 is a serial-scanning-type printer in which the ink jetting head 20 is moved in a width direction of the base material perpendicular to a transportation direction of the base material to record an image. The transportation direction of the base material is a direction in which the base material 22 is transported and is a feed direction of the base material 22.

The ink jetting head 20 is mounted on a carriage 30. The ink jet printing apparatus 16 includes a carriage driving mechanism 32. The carriage driving mechanism 32 is a mechanism that supports the carriage 30 such that the carriage 30 can reciprocate in the width direction of the base material perpendicular to the transportation direction of the base material. The carriage driving mechanism 32 includes a motor which is a power source, a transmission device, and a sensor, such as an encoder, which are not illustrated.

The ink jet printing apparatus is not limited to the serial scanning type and may be a line scanning type in which a line head is used as the ink jetting head 20.

The base material transportation mechanism 26 is a mechanism for transporting the base material 22 supplied from the base material supply unit 24. The base material transportation mechanism 26 includes a motor which is a power source, a transmission device, and a sensor for detecting the position of the base material 22, which are not illustrated.

The base material collection unit 28 collects the printed base material 22. For example, in the case of a configuration in which the base material 22 is transported by a roll-to-roll method, the base material collection unit 28 includes a winding-side mechanism that winds a continuous base material. Alternatively, in the case of a configuration in which a separate base material 22 is transported, the base material collection unit 28 may be a base material discharge unit that discharges the printed base material 22.

The ink jet printing apparatus 16 may comprise a drying unit (not illustrated) for performing a process of drying the ink applied to the base material 22. The drying unit (not illustrated) may be mounted on the carriage 30 or may not be mounted on the carriage 30.

Image data 40 and base material information 42 are input to the image processing apparatus 12. The image data 40 is electronic image data of a pattern to be printed on the base material 22. The base material information 42 is information related to the base material 22 used for printing. The image processing apparatus 12 processes the image data 40 on the basis of the input image data 40 and base material information 42 to generate image information of each color component for specifying a position where each of the C, M, Y, and K inks is applied by the ink jet printing apparatus 16 and a position where each of the C, M, Y, and K inks is not applied by the ink jet printing apparatus 16.

The image processing apparatus 12 can be implemented by a combination of the software and hardware of a computer. The software is synonymous with a program. In addition, some or all of the processing functions of the image processing apparatus 12 can be implemented by an integrated circuit. The image processing apparatus 12 is connected to the printing control device 14. The printing control device 14 is connected to the ink jet printing apparatus 16.

The term "being connected" means a relationship capable of transmitting information and may be a contact connection or a non-contact connection. The term "connection" includes, for example, a contact connection, a wired connection, a wireless connection, an optical communication connection between corresponding terminals, or an appropriate combination thereof. In addition, the connection includes a network connection through an electric communication line (not illustrated).

The printing control device 14 controls a printing operation of the ink jet printing apparatus 16 on the basis of the image information generated by the image processing apparatus 12. The printing control device 14 controls the driving of the base material transportation mechanism 26 and the carriage driving mechanism 32 and controls a jetting operation of each head of the ink jetting head 20 such that a desired image is recorded on the base material 22.

In addition, the printing control device 14 may be configured as a control device provided separately from the image processing apparatus 12 or may be integrated with the image processing apparatus 12 to form one control device.

Each of the C ink jetting head 20C, the M ink jetting head 20M, the Y ink jetting head 20Y, and the K ink jetting head 20K corresponds to an example of "ink jetting means".

[Ink Bleeding Problem in Textile Printing]

In a case in which printing is performed on a textile base material, bleeding occurs significantly. In addition, bleeding varies depending on the structure of the textile base material and the quality of yarn. Elements related to the structure of the textile base material include, for example, a weaving method indicating a method for combining warp and weft, the density of each of the warp and the weft, and the thickness of each of the warp and the weft.

Figure 2:
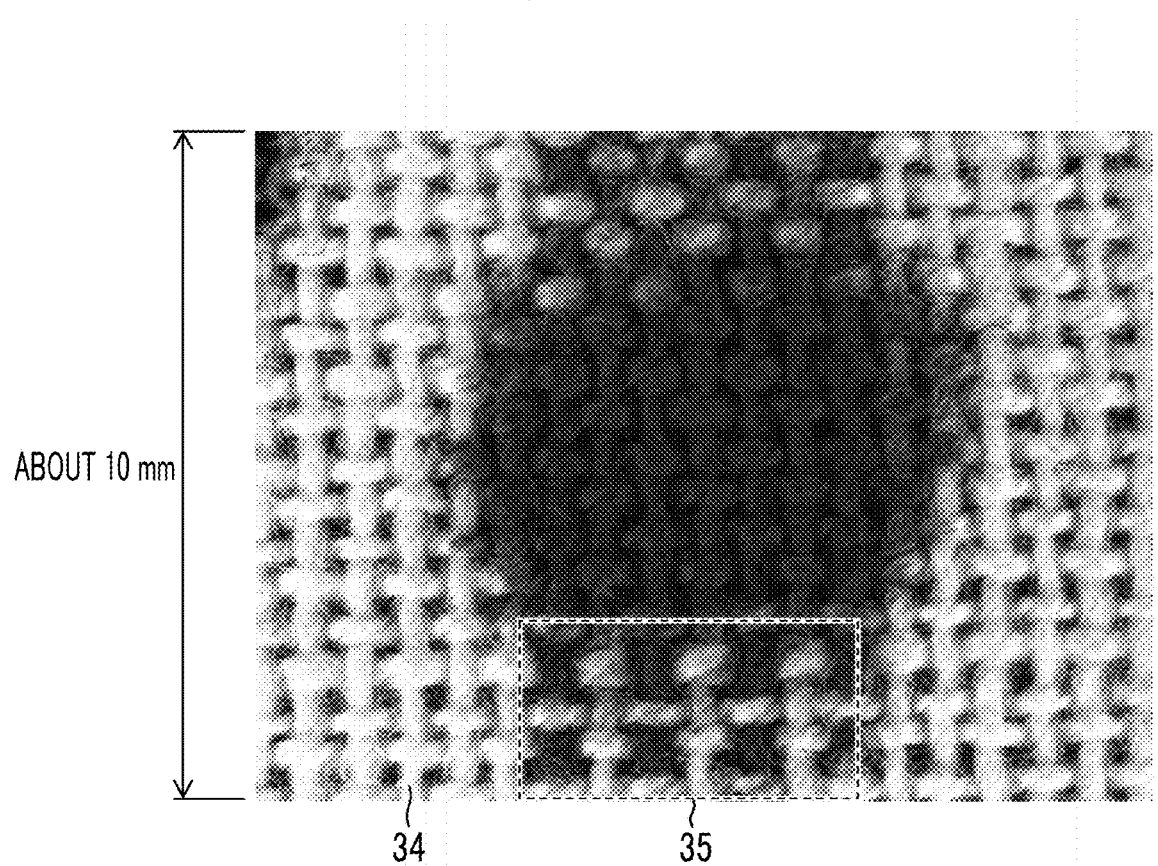
FIG. 2 is a micrograph illustrating the result of an ink drop experiment that examines the degree of bleeding of ink in a case in which ink is dropped on a cotton cloth.

FIG. 2 is a micrograph illustrating the result of an ink drop experiment that examined the degree of bleeding of ink in a case in which ink is dropped to a cotton cloth. In the ink drop experiment illustrated in FIG. 2, a pretreatment liquid was not used and the wetting and spreading of ink were observed in a case in which the pretreatment liquid was not applied to a cotton cloth 34 and ink was directly dropped from a micro syringe onto the cotton cloth 34. The cotton cloth 34 illustrated in FIG. 2 has the property that the wetting and spreading of ink in a warp direction is likely to occur. The ink dropped to the cotton cloth 34 does not wet and spread in a circular shape on the cotton cloth 34. The ink wets the cotton cloth 34 and spreads in a shape in which the amount of wetting and spreading of ink in the warp direction is more than that in the weft direction and the ink extends in the warp direction.

Figure 3:
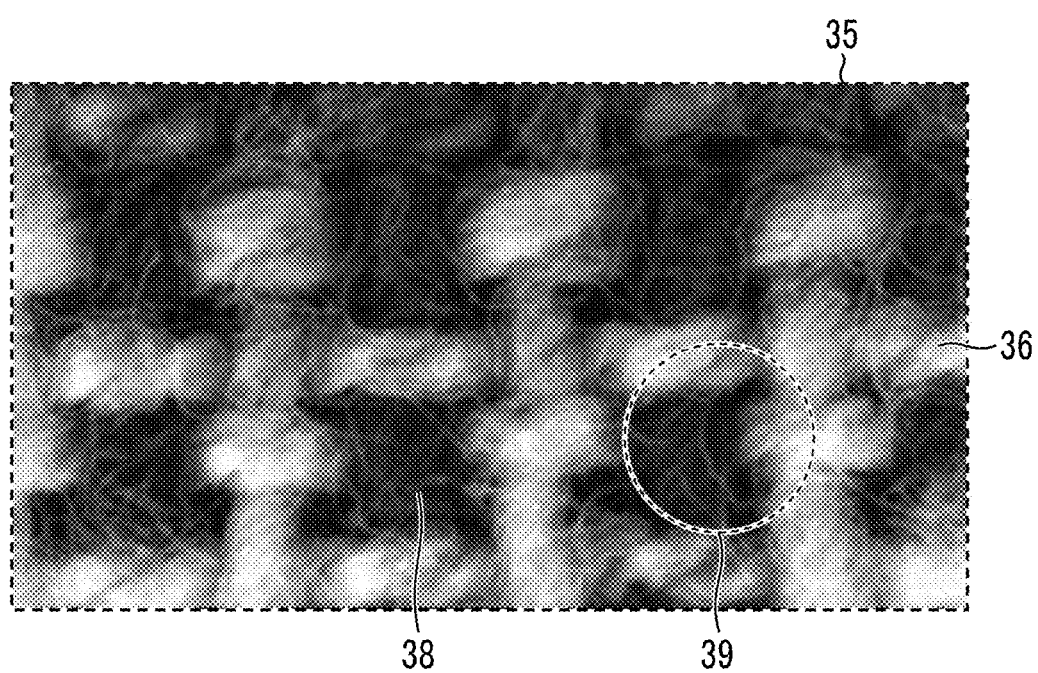
FIG. 3 is an enlarged view illustrating a region surrounded by a dashed line of FIG. 2.

FIG. 3 illustrates an enlarged image of a region 35 surrounded by a dashed line of FIG. 2. As illustrated in FIG. 3, in the cotton cloth 34 according to this example, the penetration distance of ink in warp 38 is longer than that in weft 36. In addition, as can be seen from a region surrounded by a dashed circle 39 of FIG. 3, the ink penetrates from the warp 38 to the weft 36.

Figure 4:
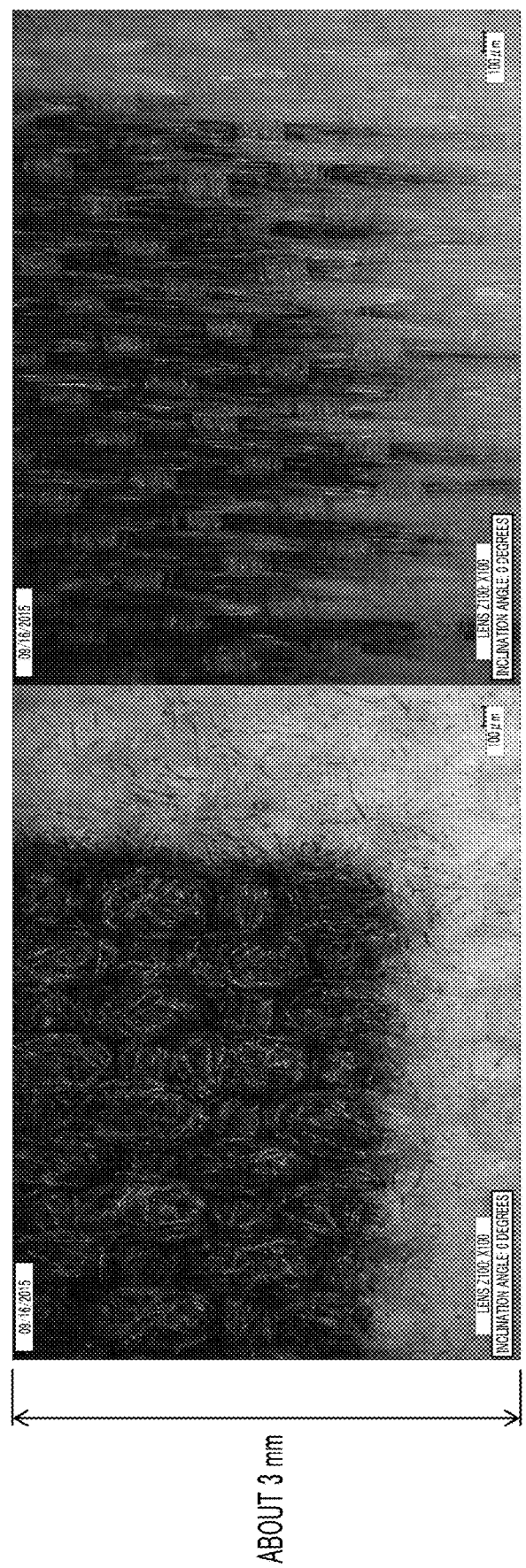
FIG. 4 is a photograph illustrating the result of a printing experiment indicating a difference in penetration distance caused by a difference in the quality of a base material.

FIG. 4 a micrograph illustrating the result of a printing experiment showing that the penetration distance varies depending on a difference in the quality of the base material. In the printing experiment illustrated in FIG. 4, no pretreatment liquids are used. A micrograph on the left side of FIG. 4 illustrates the result of ink jet printing on a cotton cloth and a micrograph on the right side of FIG. 4 illustrates the result of ink jet printing on a polyester cloth. The two micrographs are the printing results of the same rectangular pattern and have the same image position, visual field range, and magnification. As can be seen from the comparison between the two micrographs, the penetration distance of ink in the polyester cloth is longer than that in the cotton cloth.

Figure 5:
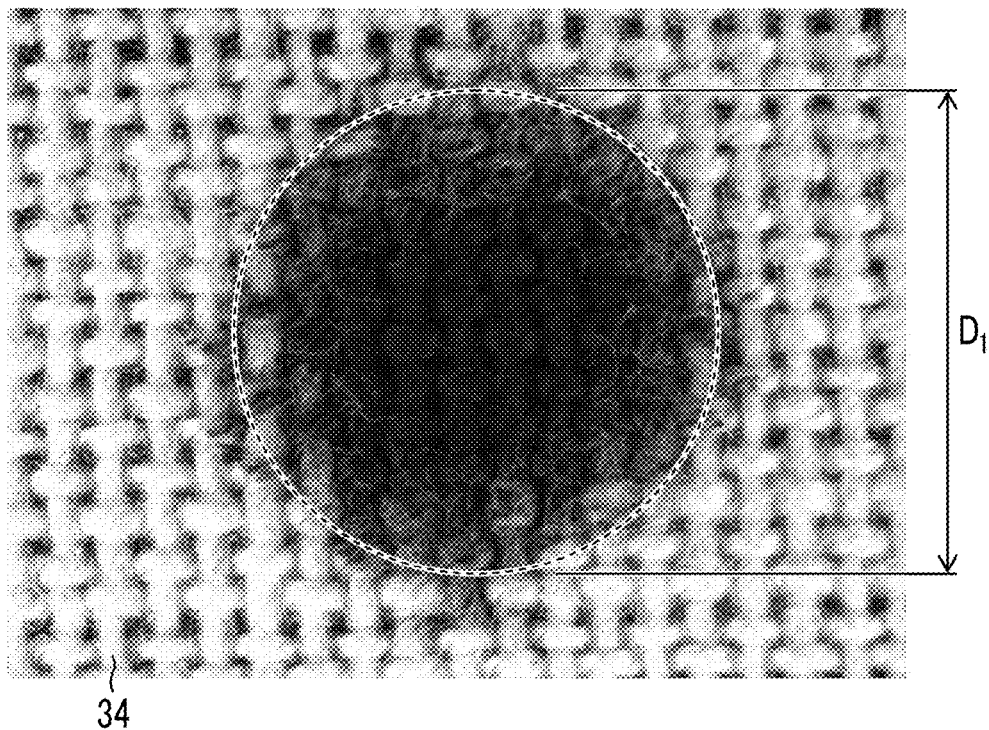
FIG. 5 is a micrograph illustrating the result of an ink drop experiment that examines an ink penetration distance in a case in which a pretreatment liquid is applied to the base material.
Figure 6:
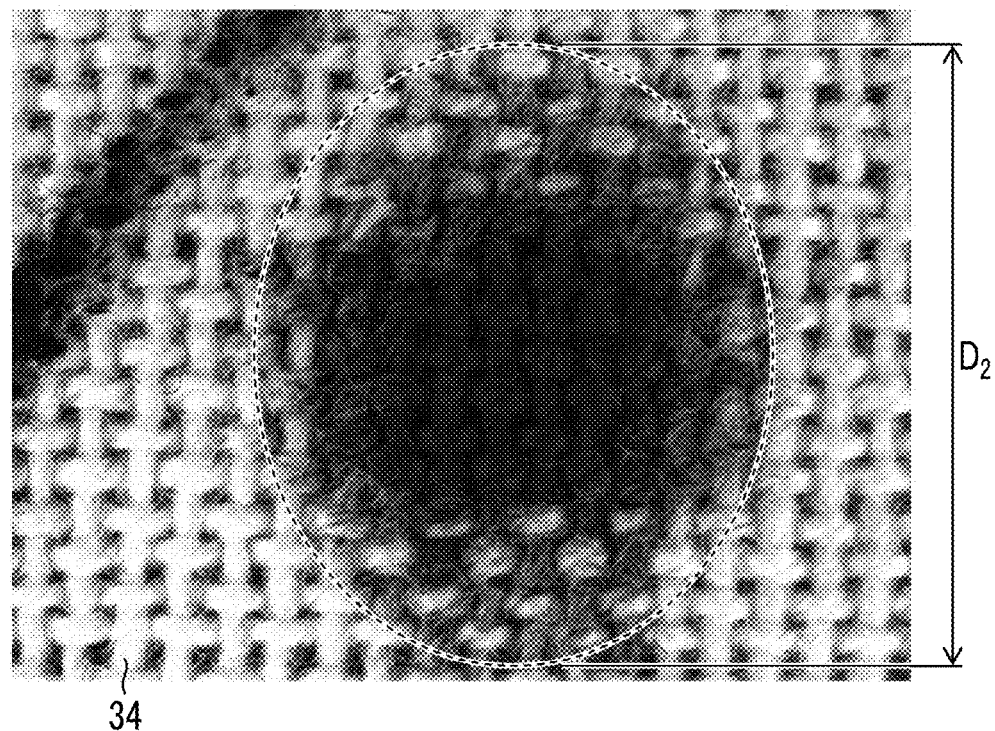
FIG. 6 is a micrograph illustrating the result of an ink drop experiment that examines an ink penetration distance in a case in which the pretreatment liquid is not applied to the base material.

FIGS. 5 and 6 are micrographs illustrating the results of an ink drop experiment that examined a difference in the penetration distance depending on the presence or absence of a pretreatment liquid. A process of applying the pretreatment liquid to the textile base material is referred to as "pretreatment" or a "pre-coating process". The pretreatment liquid is also referred to as a "pre-coating liquid". FIG. 5 illustrates the wetting and spreading result of ink in a case in which the pre-coating process is present. FIG. 6 illustrates the wetting and spreading result of ink in a case in which the pre-coating process is absent. In the ink drop experiments illustrated in FIGS. 5 and 6, the same type of cotton cloth 34 is used. In addition, FIG. 2 which has been described is a portion of FIG. 6.

As illustrated in FIG. 6, in a case in which the pre-coating process is absent, ink penetrates in the warp direction and the weft direction and the penetration distance of the ink in the warp direction is longer than that in the weft direction. As a result, the wetting and spreading shape of the ink is a substantially elliptical shape in which the ink extends in the warp direction.

In contrast, in the ink drop experiment illustrated in FIG. 5, the pretreatment liquid was uniformly applied onto a printing surface of the cotton cloth 34 and ink was dropped to the cotton cloth 34 having the pretreatment liquid applied thereto. As illustrated in FIG. 5, in a case in which the pre-coating process is present, the penetration of ink in the plane direction is prevented and the wetting and spreading shape of the ink is a substantially circular shape.

As can be seen from the comparison between FIG. 5 and FIG. 6, the length $D_1$ of the wetting and spreading range of ink in a case in which the pre-coating process is present is shorter than the length $D_2$ of the wetting and spreading range of ink in a case in which the pre-coating process is absent. The pre-coating process is effective in preventing bleeding. However, the base material to which the pretreatment liquid has been applied is hardened and the texture is damaged. In a case in which the pretreatment liquid is used to prevent the bleeding, a cleaning step of cleaning off the components of the remaining pretreatment liquid attached to the base material is generally performed after printing. There is also a problem that a large amount of water is consumed in the cleaning step.

The present disclosure provides an image formation technique that can solve the problem of deterioration of image quality caused by bleeding, without using a pretreatment liquid that damages texture, particularly, can prevent the deterioration of image quality caused by bleeding in correspondence with the difference between wetting and spreading in the warp direction and wetting and spreading in the weft direction depending on various types of base materials.

[Description of Image Formation Technique in Embodiment]

Figure 7:
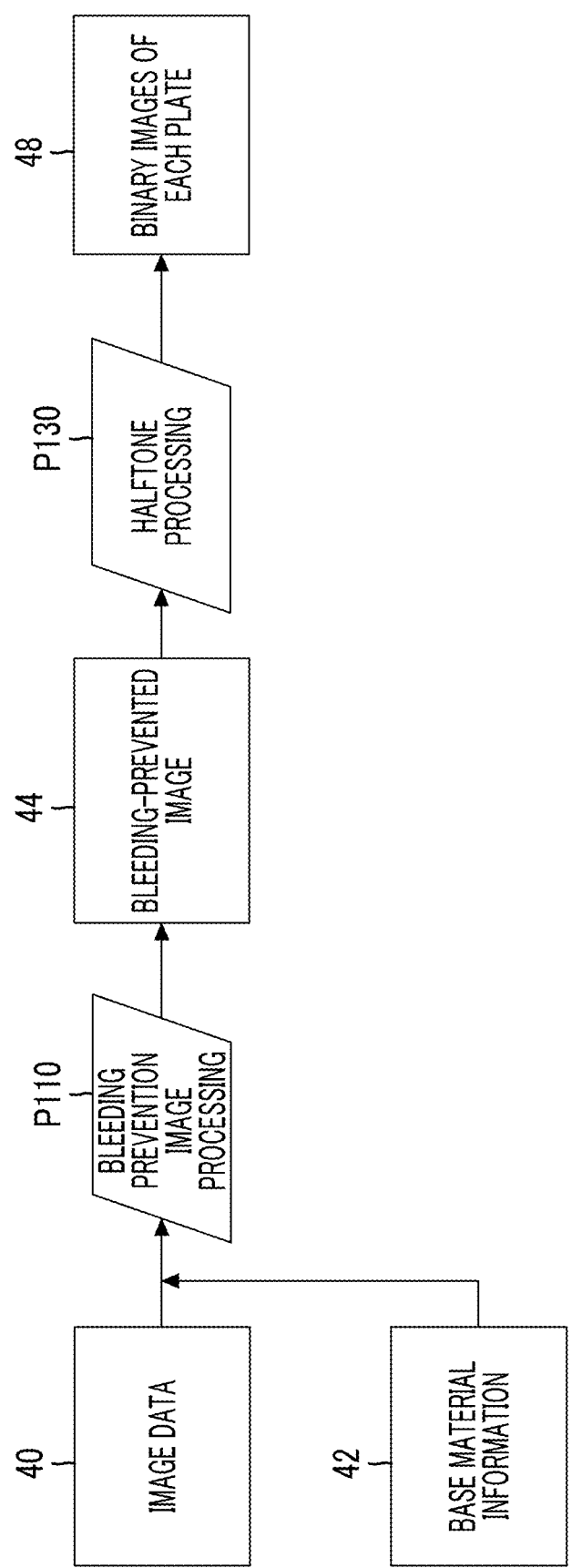
FIG. 7 is a block diagram illustrating the outline of an image processing flow in an image processing apparatus according to the embodiment.

FIG. 7 is a block diagram illustrating the outline of an image processing flow of the image processing apparatus 12 according to the embodiment. The image processing apparatus 12 performs bleeding prevention image processing P110 for generating image information for determining C, M, Y, and K printing patterns so as to reduce the deterioration of image quality caused by the wetting and spreading of ink, considering the wetting and spreading characteristics of ink for each type of textile base material.

That is, the image processing apparatus 12 has a function of performing the bleeding prevention image processing P110 for generating a bleeding-prevented image 44 indicating an ink application pattern in which the deterioration of image quality caused by bleeding is prevented as a result in anticipation of the wetting and spreading of ink, on the basis of the image data 40 and the base material information 42. The bleeding-prevented image 44 is image information indicating a pattern for defining an ink application position where each of the C, M, Y, and K inks is applied and an ink non-application position where the application of the ink is limited. Each of the C, M, Y, and K printing patterns is specified from the bleeding-prevented image 44.

Each of the C, M, Y, and K printing patterns is determined according to the image data 40 of the pattern to be printed and the base material information 42 of the base material 22 which is the medium to be printed. The content of the bleeding prevention image processing P110 will be described in detail below.

The data format of the image data 40 input to the image processing apparatus 12 is not particularly limited. In this embodiment, it is assumed that the image data 40 is a CMYK image in which a signal value of each color component of C, M, Y, and K is determined for each pixel. The CMYK image indicates a digital image in which each pixel has a C signal value, an M signal value, a Y signal value, and a K signal value. It is assumed that the signal value of each color component is represented by 8 bits, that is, 0 to 255 gray levels. The signal value is also referred to as a pixel value. However, the image data 40 is not limited to the CMYK image and may be, for example, an RGB image in which the signal value of each color component of red (R), green (G), and blue (B) is determined for each pixel or may be the form of a combination of C, M, Y, and K signals and a special color signal. In addition, the number of gray levels (the number of bits) of the image signal is not limited to this example. In a case in which image data is given as the RGB image, the image data can be converted into a CMYK image by a color conversion process of converting an RGB color space into a CMYK color space. The image processing apparatus 12 may have the function of the color conversion process.

The type information of the warp and the weft, the thickness information of yarn, the type information of a weaving method are used as the base material information 42. The type information of yarn is information related to the quality of fiber, that is, information related to the type of yarn. In some cases, the type of yarn is expressed by the term "yarn type", "fiber type", or "base material type".

Examples of the representative type of yarn include cotton, polyester, wool, silk, hemp, rayon, and acrylic. The yarn is not limited to a pure yarn and may be a blended yarn or a twisted yarn. For the cloth in which the warp and the weft are the same type, the type information of one of the warp and the weft may be specified. For cloth, such as a union cloth, in which the type of weft is different from the type of warp, it is preferable to specify the type information of each of the warp and the weft.

The thickness of the yarn is represented, for example, by a number that is called a "count". As the yarn count becomes larger, the thickness of the yarn becomes smaller. In addition, a unit indicating the thickness of the yarn is not limited to the count and may be, for example, text or denier.

Examples of the type of weaving include plain weave, twill, and satin weave, depending on a combination of the warp and the weft. The type of weaving is referred to as a "weave type" and the information of the type of weaving is referred to as "weave type information". However, the weave type information may include information for specifying the type of knitted fabric or non-woven fabric other than the woven fabric.

The bleeding-prevented image 44 is digital image data indicating a pattern drawn by the ink jetting head 20. The bleeding-prevented images 44 are four separated images corresponding to C, M, Y, and K components and the bleeding-prevented images 44 of each plate are, for example, continuous-tone image data in which each pixel is represented by an 8-bit signal value. An image position where C, M, Y, and K inks are applied and the amount of ink applied are determined on the basis of the bleeding-prevented image 44.

In addition, the image processing apparatus 12 has a function of performing halftone processing P130 for the data of the bleeding-prevented image 44. The halftone processing P130 is a process that converts a continuous-tone image into a dot pattern image according to a predetermined halftone processing rule. The halftone processing P130 converts image data represented by multiple gray levels, for example, 0 to 255 gray levels into binary dot data or dot data represented by multiple values equal to or greater than a ternary value that is less than the number of gray levels of input image data. The dot data is the data of a dot pattern image indicating a dot arrangement pattern. Here, the dot data is described as a binary image indicating the presence or absence of a dot in each pixel.

Binary images 48 of each plate are obtained by the halftone processing P130. The "binary images 48 of each plate" mean a dot pattern image indicating the arrangement of dots corresponding to an ink jet output corresponding to each of the C, M, Y, and K plates. Ink jet printing is plateless printing and printing by each of the C ink jetting head 20C, the M ink jetting head 20M, the Y ink jetting head 20Y, and the K ink jetting head 20K can be understood by the expanded concept of the "plate".

In the halftone processing P130, it is possible to use a halftone algorithm such as a dither method or an error diffusion method. The halftone processing rule may vary depending on image recording conditions or the pattern to be printed. The halftone processing rule is specified by a combination of a halftone algorithm and halftone parameters. The halftone parameters of the dither method include, for example, the size and threshold value of a dither mask. The halftone parameters of the error diffusion method include, for example, the size and diffusion coefficient of an error diffusion matrix.

In the C, M, Y, and K bleeding-prevented images 44, the printing pattern of each of the C, M, Y, and K inks is determined by the halftone processing.

Figure 8:
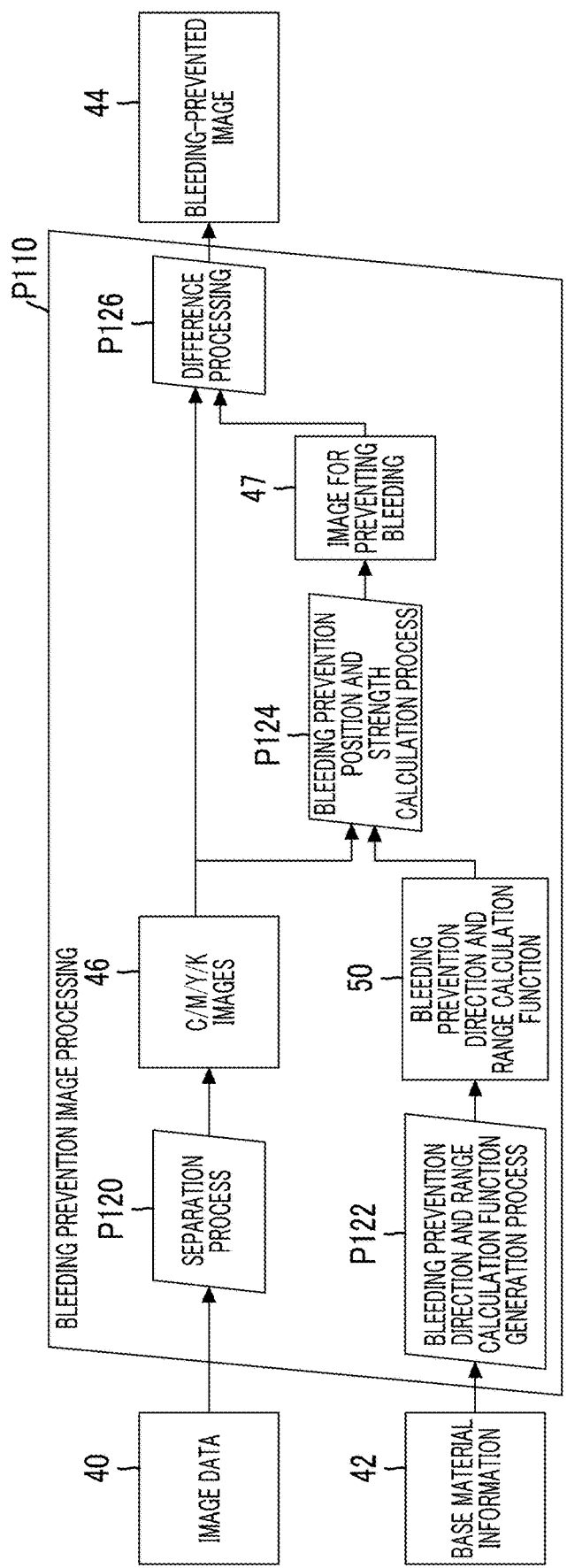
FIG. 8 is a process block diagram illustrating the content of a pretreatment liquid image generation process.

FIG. 8 is a block diagram illustrating the content of the bleeding prevention image processing P110. In FIG. 8, the same components as those in the configuration illustrated in FIG. 7 are denoted by the same reference numerals.

The bleeding prevention image processing P110 includes a separation process P120, a bleeding prevention direction and range calculation function generation process P122, a bleeding prevention position and strength calculation process P124, and difference processing P126. The separation process P120 decomposes the image data 40 into four C, M, Y, and K images. The term "separation" means dividing the image data into independent image data items of each color of the ink used by the ink jet printing apparatus 16. A C image, an M image, a Y image, and a K image generated by the separation process P120 are referred to as separated images 46. In FIG. 8, the separated images 46 are represented by "C/M/Y/K images".

The bleeding prevention direction and range calculation function generation process P122 is a process of generating a bleeding prevention direction and range calculation function 50 from the base material information 42 according to a predetermined function generation rule. Here, the term "function" indicates a filter function.

The "direction" in the bleeding prevention direction and range means the direction of a bleeding prevention process corresponding to the wetting and spreading direction of ink, specifically, the warp direction or the weft direction. The warp direction means the vertical direction and the weft direction means the horizontal direction.

The "range" in the bleeding prevention direction and range means the range of pixels affected by the wetting and spreading of ink. The bleeding prevention direction and range calculation function 50 is, for example, a longitudinal filter that is used to calculate the signal value of a pixel in the bleeding prevention range considering the wetting and spreading of ink in the vertical direction, a lateral filter that is used to calculate the signal value of a pixel in the bleeding prevention range considering the wetting and spreading of ink in the horizontal direction, or both the longitudinal filter and the lateral filter.

The longitudinal filter is a filter that acts on a column of the pixels arranged in the vertical direction of the image and has a filter size and filter coefficient arrangement considering bleeding in the vertical direction. The lateral filter is a filter that acts on a column of the pixels arranged in the horizontal direction of the image and has a filter size and filter coefficient arrangement considering bleeding in the horizontal direction. Each of the longitudinal filter and the lateral filter is a filter having direction dependence in which the wetting and spreading direction of ink is reflected.

The concept of "generating" a function includes selecting a corresponding function from a database of the functions corresponding to each of a plurality of base material types which have been prepared in advance. In this embodiment, filter functions for the vertical and horizontal directions are prepared in advance for a combination of representative data of the yarn type, the thickness of a yarn, and the weave type. The database of the filter functions prepared in advance is stored in an internal storage device (not illustrated) of the image processing apparatus 12 or an external storage device (not illustrated) connected to the image processing apparatus 12.

The bleeding prevention direction and range calculation function generation process P122 reads data corresponding to the base material information 42 from the database of the filter functions prepared in advance and generates a longitudinal filter and a lateral filter using the read data. The generation of the bleeding prevention direction and range calculation function 50 is synonymous with the determination of the bleeding prevention direction and range calculation function 50.

The base material information 42 includes at least the information of the yarn type among the yarn type, the thickness of yarn, and the weave type. It is preferable that two or more information items including at least the information of the yarn type among the weave type, the yarn type, and the thickness of yarn are used as the base material information 42. In this embodiment, the user designates the weave type, the yarn type, and the thickness of yarn to input the base material information 42 to the image processing apparatus 12 through a user interface (not illustrated) of the image processing apparatus 12.

For the designation of the weave type, for example, the corresponding type of weave is designated from three representative types of plain weave, twill, and satin weave. In addition, for example, the designation of the type of non-woven fabric or knitted fabric may be received if necessary.

For the designation of the yarn type, for example, any one of cotton, polyester, nylon, hemp, and wool is designated for each of the warp and the weft. In addition, a selection candidate in a case in which the yarn type is designated is not limited to the above-mentioned pure yarn and may include a blended yarn of a plurality of types of fibers, such as a blended yarn of cotton and polyester, a twisted union yarn, and other composite fiber yarns. In the case of the composite fiber yarn, it is possible to designate information for specifying a composition ratio, such as a blending ratio, in addition to information for specifying a combination of the types of fiber.

For the designation of the thickness of yarn, for example, the count of each of the warp and the weft is designated.

For example, the following Rules 1 and 2 can be given as an example of the function generation rule in the bleeding prevention direction and range calculation function generation process P122.

[Rule 1] A filter function corresponding to the type of warp and weft in the base material information 42 is selected from the filter functions that have been prepared in advance.

[Rule 2] In a case in which the thickness of the yarn in the base material information 42 is different from the representative data stored in advance, interpolation is performed from the representative data and a filter coefficient corresponding to the thickness of the yarn in the base material information 42 is determined. For example, a weighted average is calculated by linear interpolation as the interpolation.

[Specific Examples of Filter Function]

FIGS. 9 to 14 are graphs illustrating specific examples of the filter function that has been prepared in advance. FIGS. 15 and 16 illustrate filters indicating specific examples of the bleeding prevention direction and range calculation function 50 generated by the bleeding prevention direction and range calculation function generation process P122.

Figure 9:
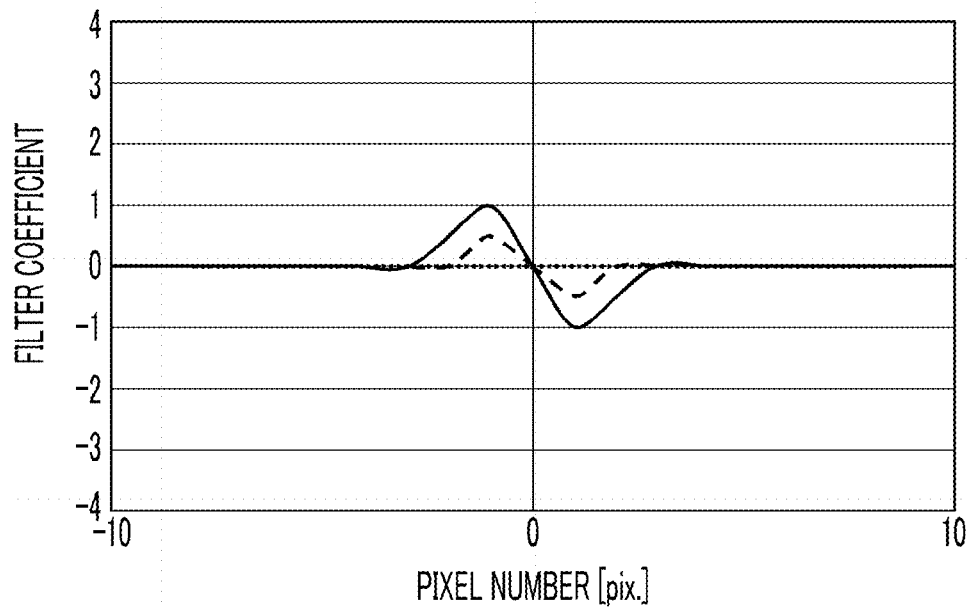
FIG. 9 is a graph illustrating a specific example of a filter function.

FIG. 9 illustrates a lateral filter function for the base material, whose yarn type is cotton and whose weave type is plain weave. FIG. 9 illustrates a filter function for three types of yarn whose thicknesses are cotton counts of 120, 60, and 30. In FIG. 9, the horizontal axis indicates a pixel number in the horizontal direction and the unit is pixels [pix] at the same pixel interval as the resolution of the original image. The origin on the horizontal axis corresponds to the position of a center pixel of the filter. In FIG. 9, the vertical axis indicates a filter coefficient.

Figure 10:
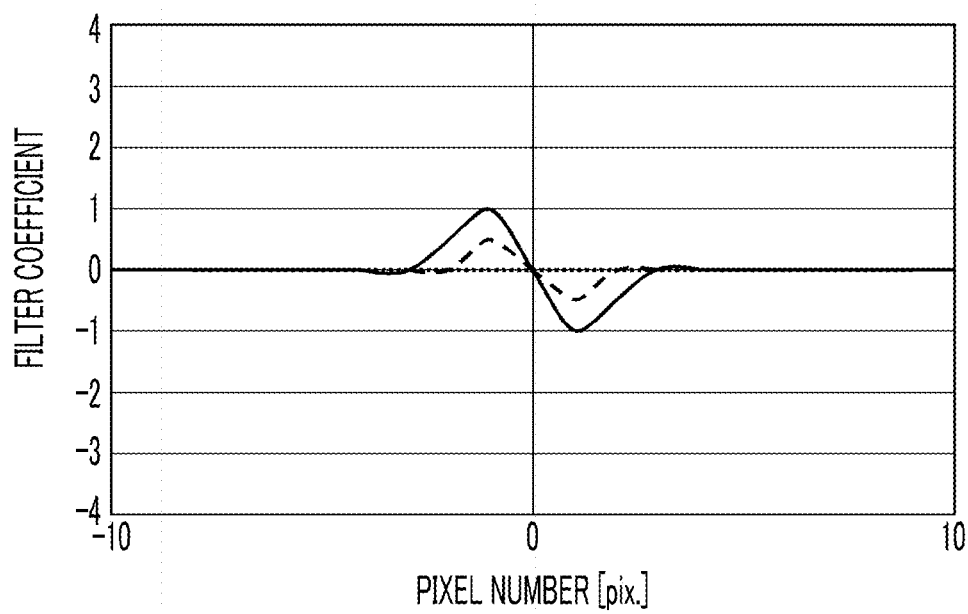
FIG. 10 is a graph illustrating a specific example of the filter function.

FIG. 10 illustrates a longitudinal filter function for the base material whose yarn type is cotton and whose weave type is plain weave. FIG. 10 illustrates a filter function for three types of yarn whose thicknesses are cotton counts of 120, 60, and 30. In FIG. 10, the horizontal axis indicates a pixel number in the vertical direction and the unit is pixels [pix] at the same pixel interval as the resolution of the original image. The origin on the horizontal axis corresponds to the position of a center pixel of the filter.

Figure 11:
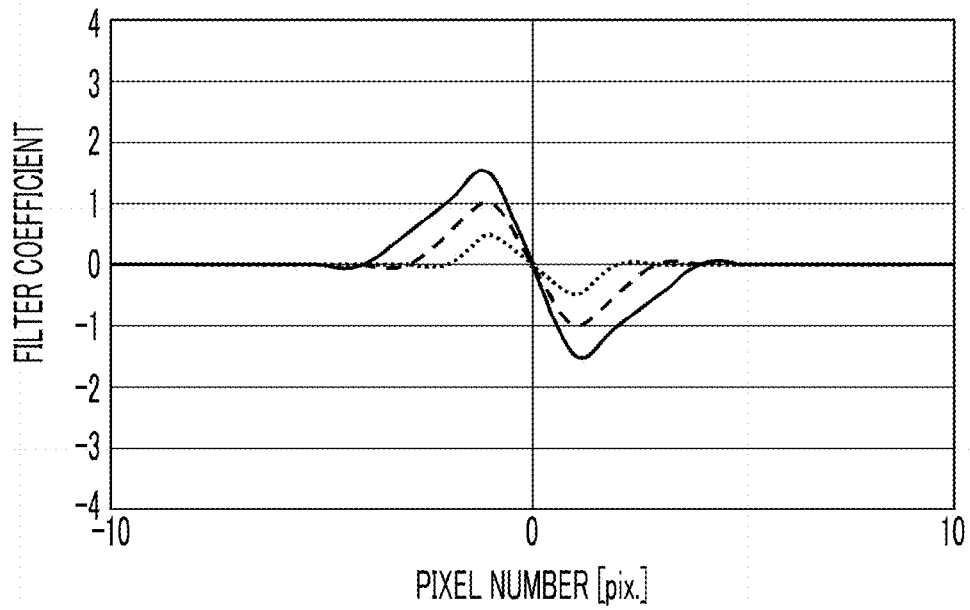
FIG. 11 is a graph illustrating a specific example of the filter function.

FIG. 11 illustrates a lateral filter function for the base material whose yarn type is cotton and whose weave type is twill. FIG. 11 illustrates a filter function for three types of yarn whose thicknesses are cotton counts of 120, 60, and 30. In FIG. 11, the definition of each of the horizontal axis and the vertical axis is the same as that in FIG. 9.

Figure 12:
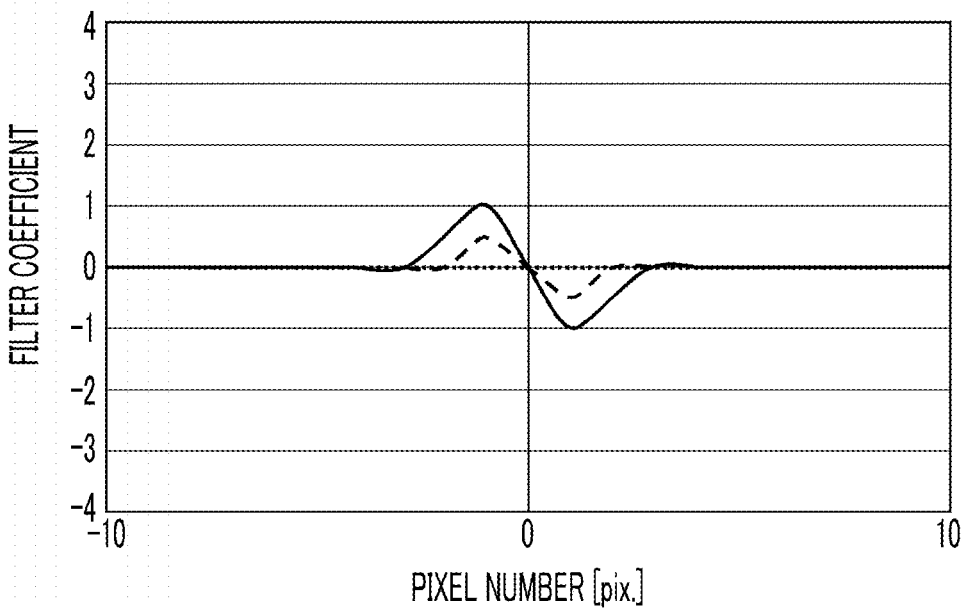
FIG. 12 is a graph illustrating a specific example of the filter function.

FIG. 12 illustrates a longitudinal filter function for the base material whose yarn type is cotton and whose weave type is twill. FIG. 12 illustrates a filter function for three types of yarn whose thicknesses are cotton counts of 120, 60, and 30. In FIG. 12, the definition of each of the horizontal axis and the vertical axis is the same as that in FIG. 10.

Figure 13:
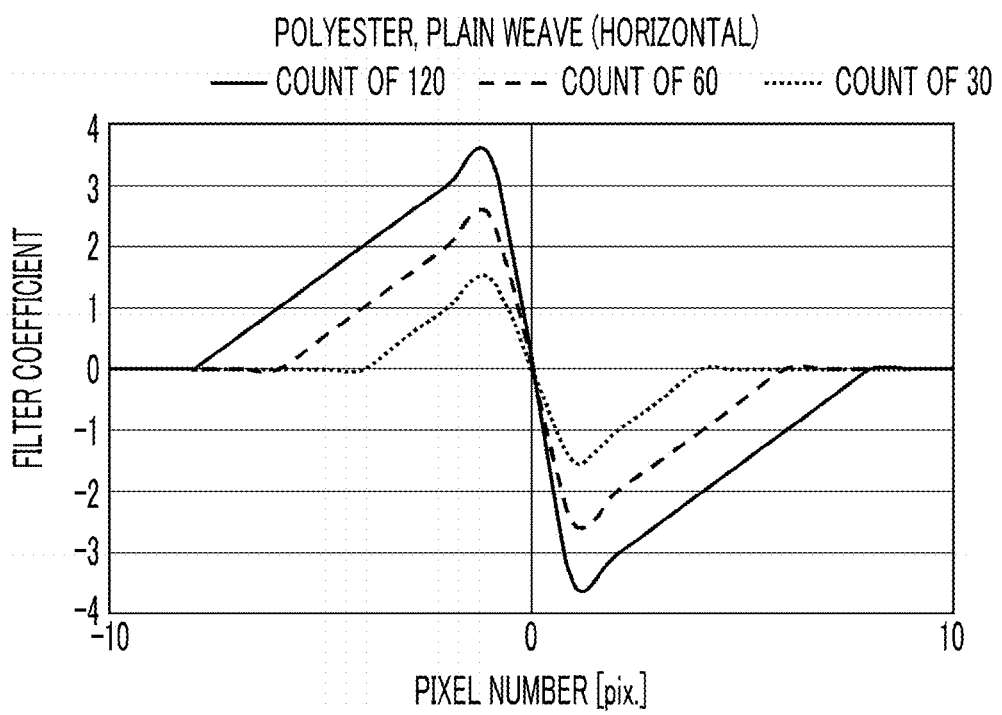
FIG. 13 is a graph illustrating a specific example of the filter function.

FIG. 13 illustrates a lateral filter function for the base material whose yarn type is polyester and whose weave type is plain weave. FIG. 13 illustrates a filter function for three types of yarn whose thicknesses are cotton counts of 120, 60, and 30. In FIG. 13, the definition of each of the horizontal axis and the vertical axis is the same as that in FIG. 9.

Figure 14:
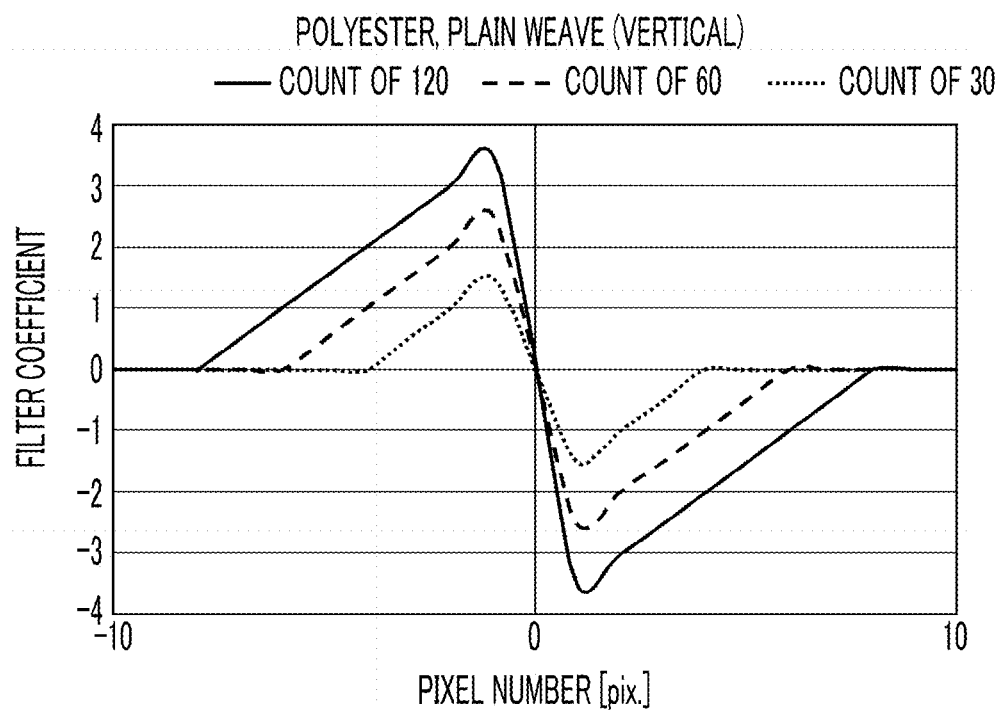
FIG. 14 is a graph illustrating a specific example of the filter function.

FIG. 14 illustrates a longitudinal filter function for the base material whose yarn type is polyester and whose weave type is plain weave. FIG. 14 illustrates a filter function for three types of yarn whose thicknesses are cotton counts of 120, 60, and 30. In FIG. 14, the definition of each of the horizontal axis and the vertical axis is the same as that in FIG. 10.

The data of the filter functions illustrated in FIGS. 9 to 14 is stored as a function database in advance. The data of the function corresponding to the base material information 42 is read from the function database, using the base material information 42 as a search key, and the read data is used to generate a filter.

For example, in a case in which the yarn type of the base material 22 used for printing is cotton, the weave type thereof is plain weave, and the base material 22 has the weft whose thickness is a count of 60 and the warp whose thickness is a count of 120, a lateral filter is generated from 60-count data illustrated in FIG. 9 (see FIG. 15) and a longitudinal filter is generated from 120-count data illustrated in FIG. 10 (see FIG. 16). FIG. 15 illustrates a lateral filter 50A generated from the 60-count data illustrated in FIG. 9. The lateral filter 50A is an edge enhancement filter that acts in an image direction parallel to the horizontal direction. FIG. 16 illustrates a longitudinal filter 50B generated from the 120-count data illustrated in FIG. 10. The longitudinal filter 50B is an edge enhancement filter that acts in an image direction parallel to the vertical direction. In the bleeding prevention direction and range calculation function generation process P122, an edge enhancement filter having direction dependence is generated on the basis of the base material information 42.

<Method for Creating Filter Function>

Here, a method for generating the filter functions illustrated in FIGS. 9 to 14 will be described. The basic idea is to generate a filter from a difference between an output image as a reproduction target and an output image actually printed on the base material. However, in practice, the output image as the reproduction target and the actual output image have randomness. Therefore, approximate functions for each image are generated and a filter is generated from the difference between the approximate functions. A sigmoid function can be used as the approximate function.

Figure 17:
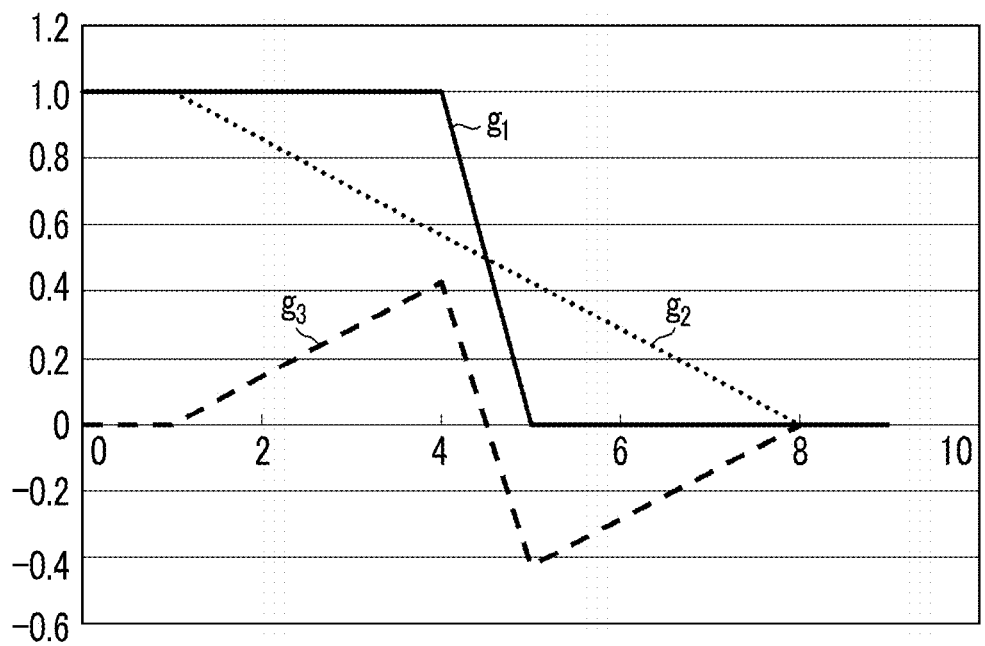
FIG. 17 is a graph illustrating a difference between an output image as a reproduction target and an actual output image.

FIG. 17 is a graph illustrating the difference between the output image as the reproduction target and the actual output image. The horizontal axis indicates a pixel number at the resolution of the output image from the ink jet printing apparatus 16. Here, the horizontal axis indicates an image position in the X direction. The vertical axis indicates the relative value of the reflection density of the image. In FIG. 17, a graph $g_1$ indicates the reflection density of the output image as the reproduction target. A graph $g_2$ indicates the reflection density of the actual output image. A graph $g_3$ indicates a difference between the graph $g_1$ and the graph $g_2$. In FIG. 17, for ease of conceptual understanding, each of the graph $g_1$ and the graph $g_2$ is represented by a simple polygonal line. A filter function can be generated from difference information illustrated in the graph $g_3$ obtained by subtracting the graph $g_2$ from the graph $g_1$.

Figure 18:
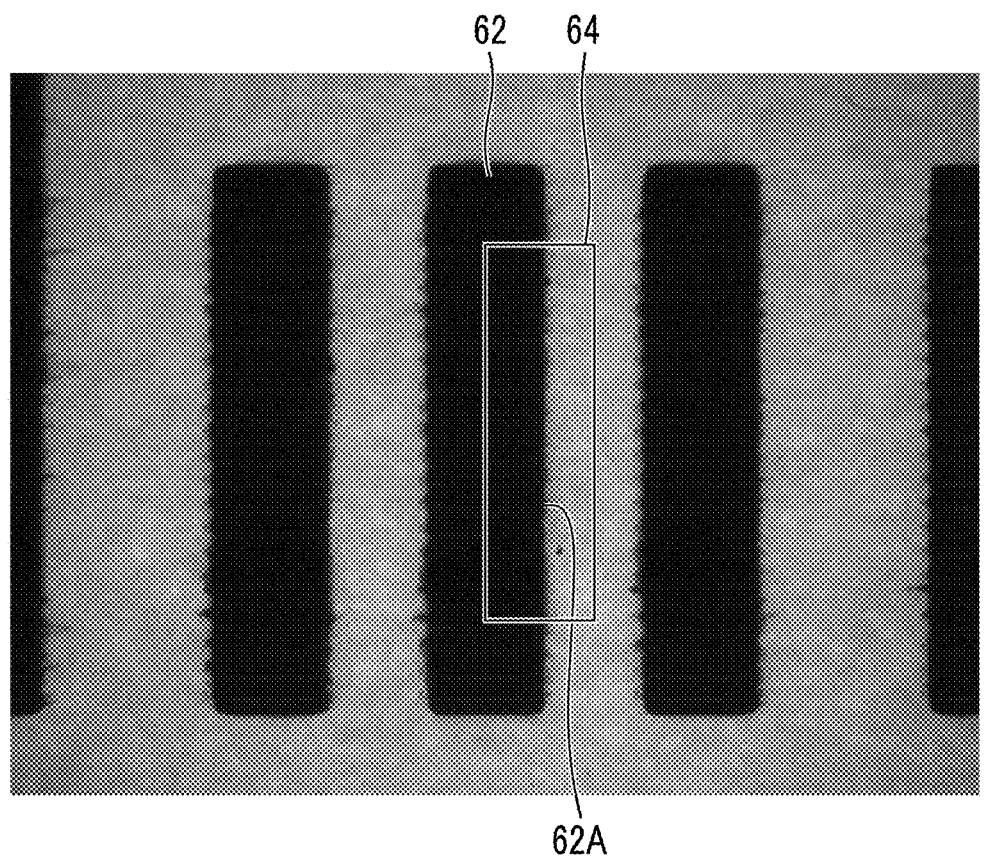
FIG. 18 is a diagram illustrating an example of a target output image.

Next, a filter generation method will be described with reference to a simple example. FIG. 18 illustrates an example of an output image as a target image. The output image as the reproduction target is referred to as a "target image". In FIG. 18, for simplicity of description, a rectangular pattern is given as an example of the target image 62. In the description with reference to FIG. 18, the horizontal direction is the X direction and the vertical direction is the Y direction.

A sampling region 64 is set in an image region including an image boundary of the target image 62. The sampling region 64 is a region of interest for evaluating print density and is a continuous region including a portion of the image region and a portion of a non-image region of the target image 62. The sampling region 64 illustrated in FIG. 18 is set as a rectangular region that has a long side parallel to the Y direction and a short side parallel to the X direction. An image boundary 62A is included in the sampling region 64.

Figure 19:
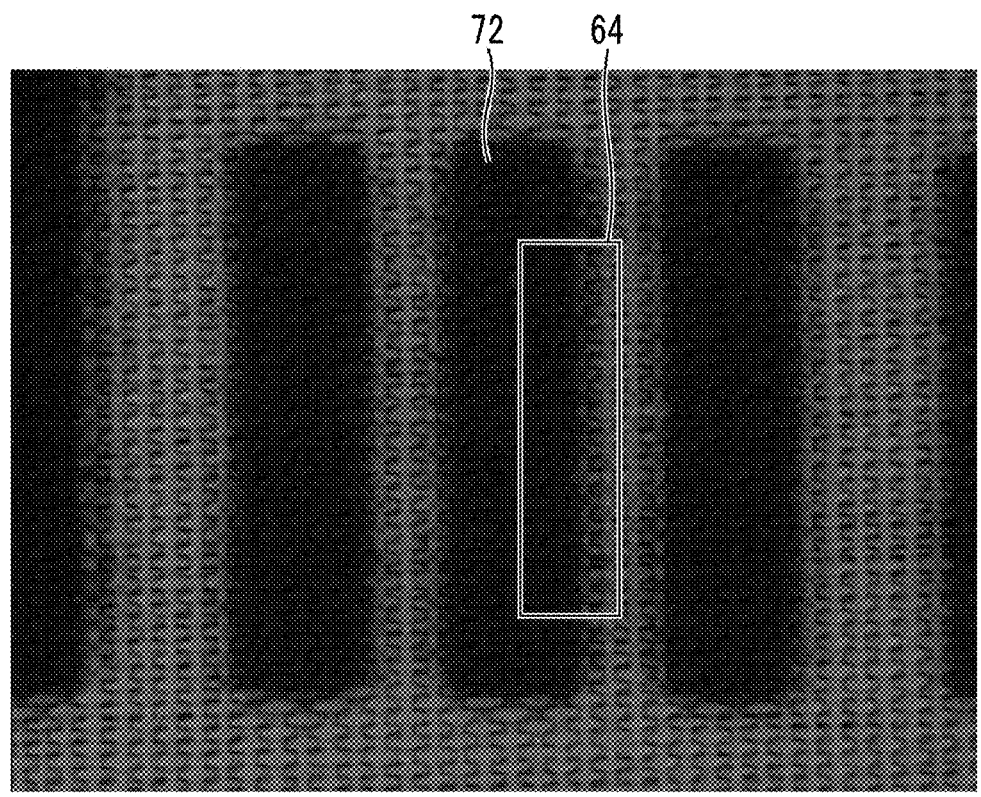
FIG. 19 is a diagram illustrating an example of an output image actually printed on the base material.

FIG. 19 illustrates an example of the output image actually printed on a textile base material. The output image actually printed on the textile base material is referred to as an "actual image". FIG. 19 illustrates an actual image 72 corresponding to the target image 62 illustrated in FIG. 18. An image range illustrated in FIG. 19 corresponds to the image range illustrated in FIG. 18. In FIG. 19, the vertical direction is the warp direction of the textile base material and the horizontal direction is the weft direction of the textile base material. It is assumed that a direction parallel to the warp direction is the Y direction and a direction parallel to the weft direction is the X direction. As can be seen from the comparison between FIG. 19 and FIG. 18, in the actual image 72, ink wets and spreads in the X direction and the Y direction.

Figure 20:
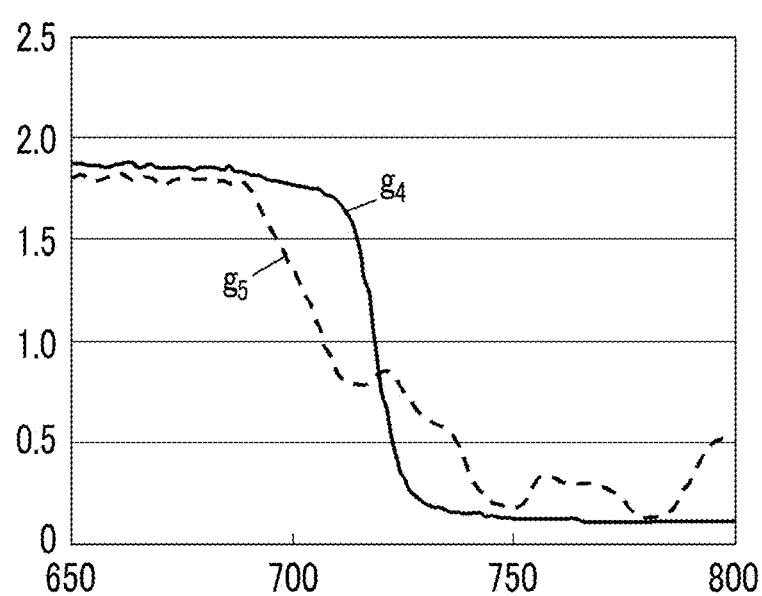
FIG. 20 is a graph illustrating the reflection density of a target image and an actual image.

FIG. 20 is a graph illustrating the reflection density of each of the target image 62 and the actual image 72. The horizontal axis indicates a pixel number in the data of an image obtained by capturing the image of the printing result using an imaging apparatus such as a photomicroscope. In this example, the horizontal axis indicates an image position in the X direction. The resolution of the captured image is higher than the output resolution of the ink jet printing apparatus 16. The vertical axis indicates the value of the reflection density. The imaging apparatus may be an image reading apparatus such as a scanner. The captured image may be restated as a read image.

In FIG. 20, a graph $g_4$ indicates the reflection density measured from the sampling region 64 of the image obtained by capturing the target image 62 illustrated in FIG. 18. A graph $g_5$ indicates the reflection density measured from the sampling region 64 of the image obtained by capturing the actual image 72 illustrated in FIG. 19. Each of the graph $g_4$ and the graph $g_5$ is a reflection density profile obtained by calculating the average value of the reflection density of the sampling region 64 in the Y direction. Each of the graph $g_4$ and the graph $g_5$ can be approximated by an approximate function of a sigmoid curve.

Figure 21:
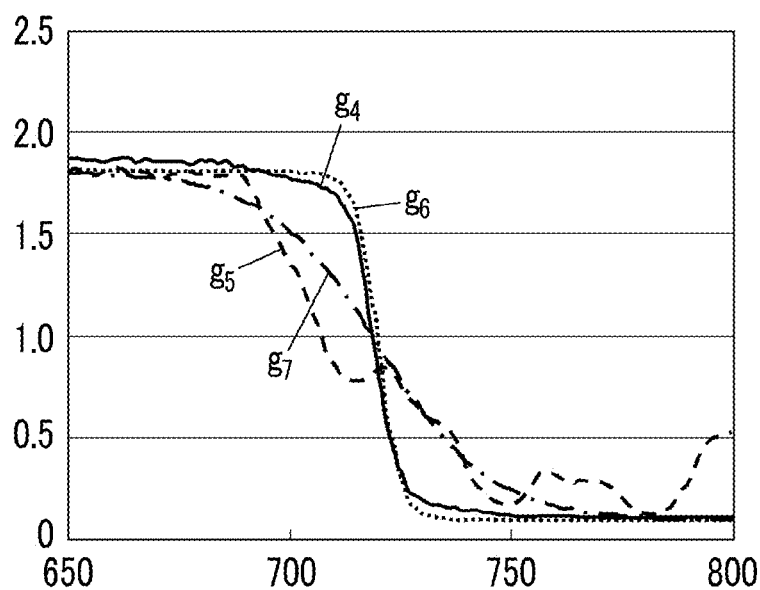
FIG. 21 is a graph illustrating the approximate functions of the target image and the actual image.

FIG. 21 illustrates graphs indicating the approximate function of the target image 62 and the approximate function of the actual image 72. In FIG. 21, a graph $g_6$ indicates the approximate function of the target image 62 and a graph $g_7$ indicates the approximate function of the actual image 72. In FIG. 21, the graph $g_4$ and the graph $g_5$ are also illustrated. The definition of each of the horizontal axis and the vertical axis is the same as that in FIG. 20.

Figure 22:
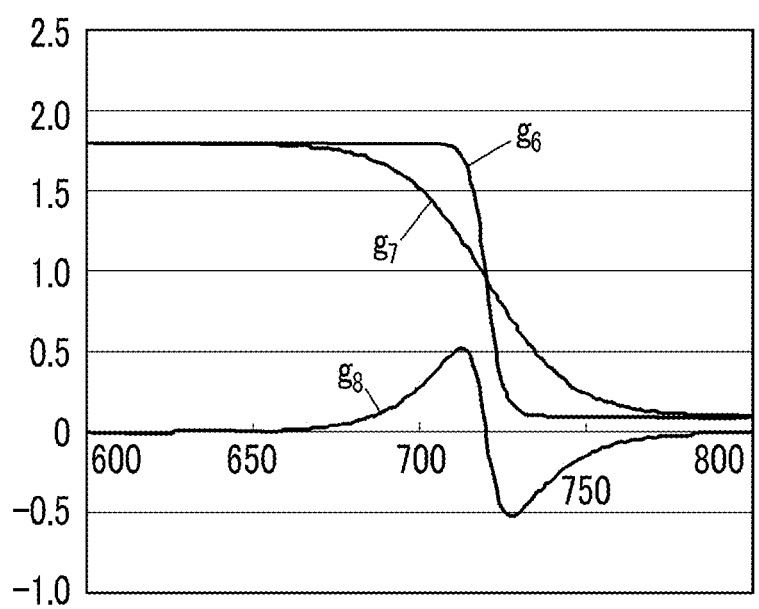
FIG. 22 is a graph illustrating a difference between the approximate function of the target image and the approximate function of the actual image.
Figure 23:
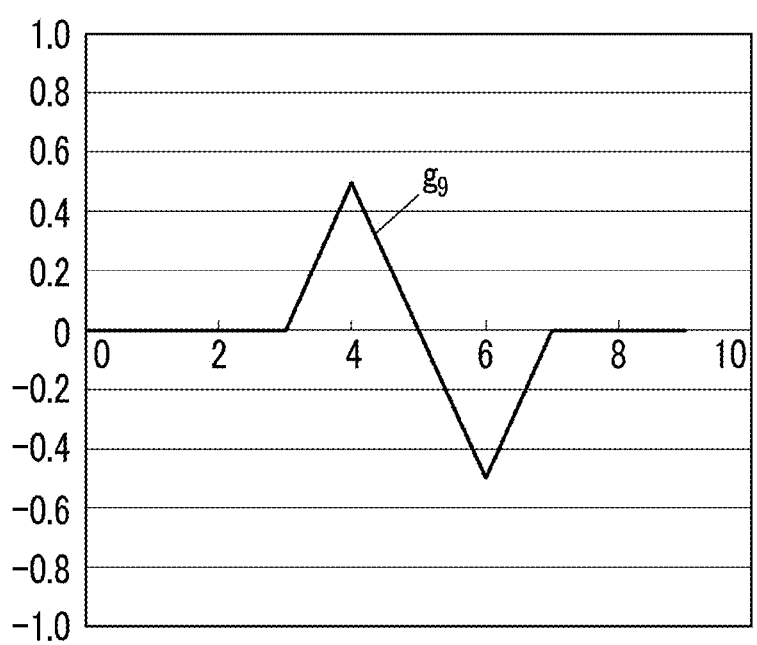
FIG. 23 is a graph obtained by converting the horizontal axis in difference information illustrated in FIG. 22 into a sampling interval of a pixel of an original image.

FIG. 22 illustrates a graph indicating the difference between the approximate function of the target image 62 and the approximate function of the actual image 72. A graph $g_8$ indicates a value obtained by subtracting the graph $g_7$ from the graph $g_6$. In FIG. 22, the definition of each of the horizontal axis and the vertical axis is the same as that in FIG. 20. In a case in which the pixel interval of the captured image is adjusted to the same sampling interval as that of the original image to adjust the form of the graph from difference information indicated by the graph $g_8$ illustrated in FIG. 22, a graph $g_9$ illustrated in FIG. 23 is obtained. In FIG. 23, the horizontal axis indicates a pixel number in the original image. In this example, the horizontal axis indicates an image position in the X direction similarly to the horizontal axis in FIG. 17. In FIG. 23, the pixel number on the horizontal axis is obtained by converting the pixel number on the horizontal axis illustrated in FIGS. 20 and 21 into the pixel number of the original image.

The difference information indicated by the graph $g_9$ in FIG. 23 is information indicating the difference of the actual image 72 from the target image 62. A filter size and a filter coefficient can be determined from the difference information. The function illustrated in FIG. 23 corresponds to wetting and spreading information indicating the wetting and spreading characteristics of ink in the base material used to form the actual image 72 illustrated in FIG. 19 in the horizontal direction. The graph $g_9$ in FIG. 23 shows that bleeding occurs in the pixel range from pixel number 4 to pixel number 6 in the X direction.

A difference in the image caused by the wetting and spreading of ink in the X direction has been described with reference to FIGS. 17 to 23. However, difference information for the wetting and spreading of ink in the Y direction can be acquired by the same method as described above. The method described with reference to FIGS. 17 to 23 is applied to combinations of various base materials and ink to acquire the information of each of the functions of various base materials illustrated in FIGS. 9 to 14 in the vertical direction and the horizontal direction. The information of the functions illustrated in FIGS. 9 to 14 includes the information of the wetting and spreading direction and the wetting and spreading range. The information of the functions illustrated in FIGS. 9 to 14 corresponds to an example of the wetting and spreading information.

[Description of Bleeding Prevention Position and Strength Calculation Process]

Figure 24:
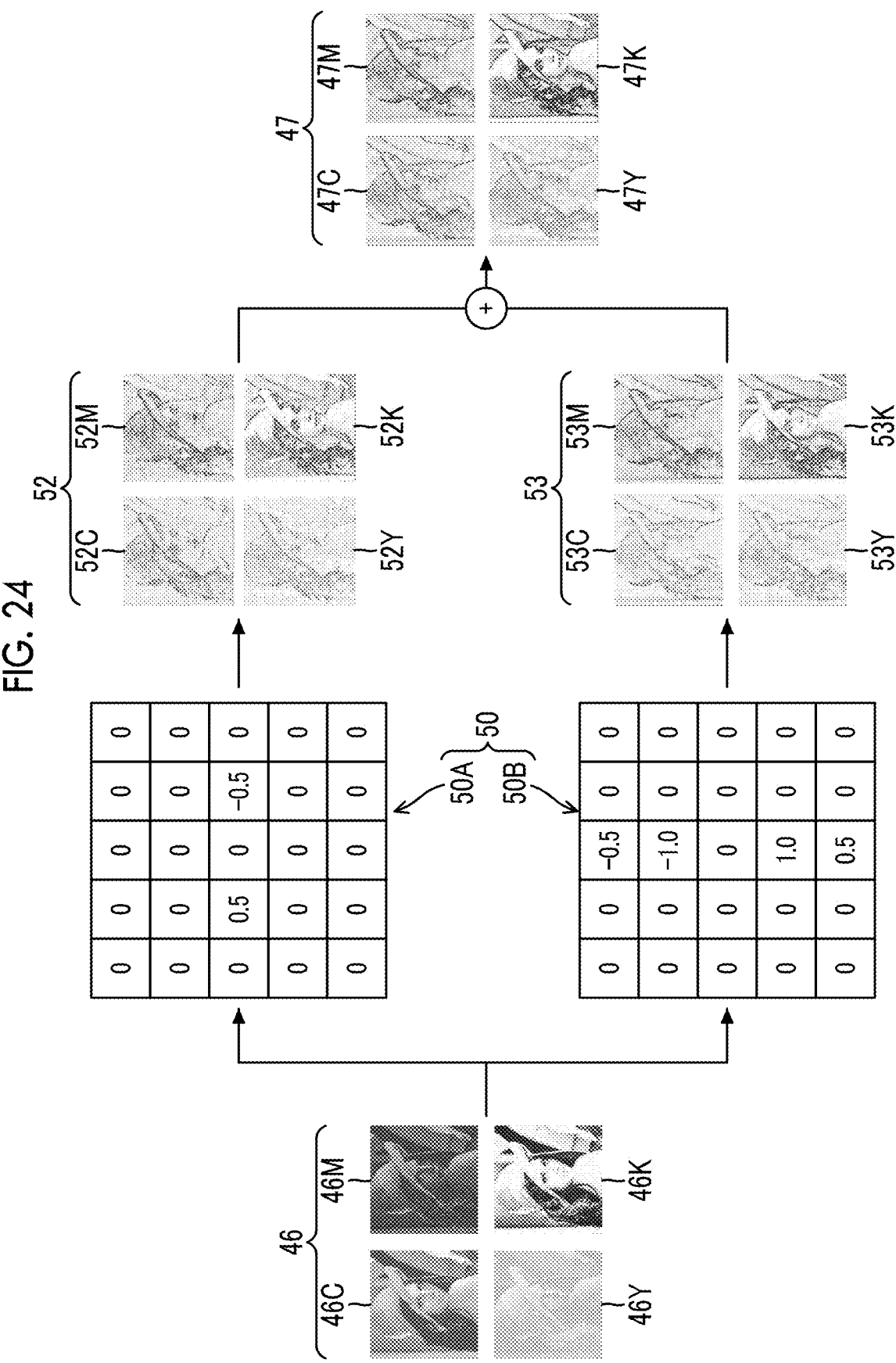
FIG. 24 is a conceptual diagram illustrating the content of a bleeding prevention position and strength calculation process.

FIG. 24 is a conceptual diagram illustrating the content of the bleeding prevention position and strength calculation process P124. The bleeding prevention position and strength calculation process P124 is a process that performs filter processing for the C, M, Y, and K separated images 46 with the bleeding prevention direction and range calculation function 50 to generate an image 47 for preventing bleeding. The image 47 for preventing bleeding is image information indicating a bleeding prevention position and bleeding prevention strength corresponding to the image data 40. The bleeding prevention position and strength calculation process P124 includes filter processing that weights each of the vertical direction and the horizontal direction, considering the wetting and spreading of ink in the base material 22, a process that calculates the absolute value of the output of the filter processing, and an addition process that adds the images resulting from the calculation of the absolute values of the outputs of the filter processing in the vertical and horizontal directions.

The bleeding prevention direction and range calculation function 50 is the filter function generated by the bleeding prevention direction and range calculation function generation process P122. The bleeding prevention direction and range calculation function 50 illustrated in FIG. 24 includes the lateral filter 50A illustrated in FIG. 15 and the longitudinal filter 50B illustrated in FIG. 16.

The separated images 46 include a C image 46C, an M image 46M, a Y image 46Y, and a K image 46K. Filter processing is performed for the separated images 46 of each color with the lateral filter 50A and the absolute value of the output of the filter processing is calculated to obtain images 52 of each color for preventing bleeding in the horizontal direction. Filter processing is performed for the C image 46C with the lateral filter 50A and the absolute value of the output of the filter processing is calculated to obtain an image 52C of a C component for preventing bleeding in the horizontal direction. Filter processing is performed for the M image 46M with the lateral filter 50A and the absolute value of the output of the filter processing is calculated to obtain an image 52M of an M component for preventing bleeding in the horizontal direction. Filter processing is performed for the Y image 46Y with the lateral filter 50A and the absolute value of the output of the filter processing is calculated to obtain an image 52Y of a Y component for preventing bleeding in the horizontal direction. Filter processing is performed for the K image 46K with the lateral filter 50A and the absolute value of the output of the filter processing is calculated to obtain an image 52K of a K component for preventing bleeding in the horizontal direction.

Similarly, filter processing is performed for the separated images 46 of each color with the longitudinal filter 50B and the absolute value of the output of the filter processing is calculated to obtain images 53 of each color for preventing bleeding in the vertical direction. Filter processing is performed for the C image 46C with the longitudinal filter 50B and the absolute value of the output of the filter processing is calculated to obtain an image 53C of a C component for preventing bleeding in the vertical direction. Filter processing is performed for the M image 46M with the longitudinal filter 50B and the absolute value of the output of the filter processing is calculated to obtain an image 53M of an M component for preventing bleeding in the vertical direction. Filter processing is performed for the Y image 46Y with the longitudinal filter 50B and the absolute value of the output of the filter processing is calculated to obtain an image 53Y of a Y component for preventing bleeding in the vertical direction. Filter processing is performed for the K image 46K with the longitudinal filter 50B and the absolute value of the output of the filter processing is calculated to obtain an image 53K of a K component for preventing bleeding in the vertical direction.

The bleeding prevention position and strength calculation process P124 adds the image 52 for preventing bleeding in the horizontal direction and the image 53 for preventing bleeding in the vertical direction for each color component to generate the images 47 of each color for preventing bleeding. The image 52C of a C component for preventing bleeding in the horizontal direction and the image 53C of a C component for preventing bleeding in the vertical direction are added to obtain an image 47C of a C component for preventing bleeding. The image 52M of an M component for preventing bleeding in the horizontal direction and the image 53M of an M component for preventing bleeding in the vertical direction are added to obtain an image 47M of an M component for preventing bleeding. The image 52Y of a Y component for preventing bleeding in the horizontal direction and the image 53Y of a Y component for preventing bleeding in the vertical direction are added to obtain an image 47Y of a Y component for preventing bleeding. The image 52K of a K component for preventing bleeding in the horizontal direction and the image 53K of a K component for preventing bleeding in the vertical direction are added to obtain an image 47K of a K component for preventing bleeding.

In a case in which a value obtained by adding the pixel value of the image 52 for preventing bleeding in the horizontal direction and the pixel value of the image 53 for preventing bleeding in the vertical direction is greater than the upper limit of the gray level, the value may be clipped to the upper limit and may be the added value. For example, in a case in which the upper limit of the gray level is "255" and the value obtained by adding the pixel value of the image 52 for preventing bleeding in the horizontal direction and the pixel value of the image 53 for preventing bleeding in the vertical direction is greater than "255", the pixel value may be 255. The image 47 for preventing bleeding becomes an edge-region-enhanced image obtained by enhancing a component in an edge region of the separated image 46.

The image 47 for preventing bleeding is image information indicating a bleeding prevention position and bleeding prevention strength. The "strength" of bleeding prevention indicates a quantitative value and is specifically represented by the magnitude of an image signal value.

[Description of Difference Processing]

In the difference processing P126 illustrated in FIG. 8, a process is performed which subtracts the images 47 of each color for preventing bleeding from the separated images 46 of each color obtained by the separation process P120 to generate the bleeding-prevented images 44 of each color. As described in FIG. 24, the C, M, Y and K images 47 for preventing bleeding generated by the bleeding prevention position and strength calculation process P124 are subtracted from the separated images 46 to obtain the C, M, Y and K bleeding-prevented images 44. In the bleeding-prevented image 44, the image signal value has been corrected such that the amount of printing of the edge is less than that in the original image data 40. That is, the bleeding-prevented image 44 is image data in which an ink application position and/or the amount of ink applied has been limited, as compared to the separated image 46.

Halftone processing is performed for the bleeding-prevented images 44 of each color to determine a dot pattern image indicating C, M, Y, and K printing patterns.

One of the vertical direction and the horizontal direction corresponds to a first direction and the other direction corresponds to a second direction. For example, the vertical direction corresponds to the first direction and the horizontal direction corresponds to the second direction. In this case, the longitudinal filter corresponds to a first direction filter and the lateral filter corresponds to second direction filter. In addition, the image 53 for preventing bleeding in the vertical direction corresponds to an example of an image for preventing bleeding in the first direction and the image 52 for preventing bleeding in the horizontal direction corresponds to an example of an image for preventing bleeding in the second direction.

[Description of Wetting and Spreading of Ink for Base Material]

A representative expression indicating the penetration of a liquid into a fiber is the following Lucas-Washburn equation.

$$l = \sqrt{\frac{r\gamma\cos\theta}{2\eta}t}$$ [Expression 1]

In the expression, l is a penetration depth, r is a capillary radius, γ is the surface tension of a liquid, θ is a contact angle between the liquid and a fiber, η is the viscosity of the liquid, and t is time. The meaning of the "penetration depth" is the same as the meaning of a "penetration distance" or a "flow distance".

Figure 25:
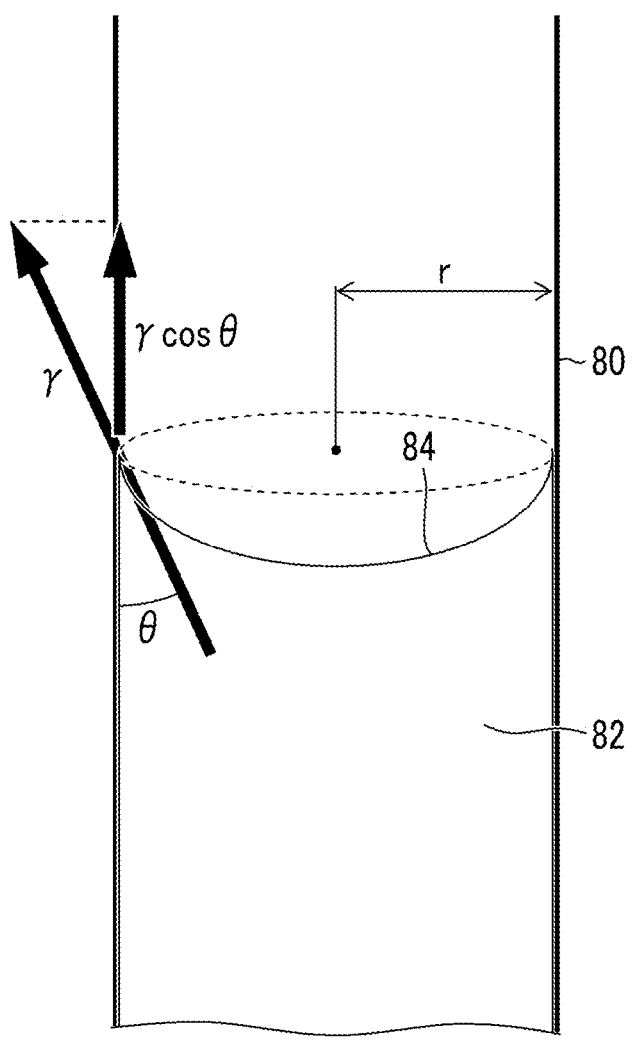
FIG. 25 is a diagram illustrating parameters of the Lucas-Washburn equation.

FIG. 25 is a diagram illustrating parameters of the Lucas-Washburn equation. In a case in which a liquid 82 penetrates along a capillary 80 with the radius r by the surface tension γ, the liquid penetrates by force acting on a meniscus 84 of the liquid 82 in the capillary 80 as illustrated in FIG. 25.

The Lucas-Washburn equation shows that, in a case in which the contact angle θ of ink with the surface of the base material changes, the penetration distance changes. The contact angle is determined from the surface tension of the base material and the surface tension of ink and the surface tension of the base material changes depending on the base material type. That is, the Lucas-Washburn equation shows that, in a case in which the base material type changes, the penetration distance, that is, the wetting and spreading distance changes. Therefore, the information of the base material type can be useful to evaluate the wetting and spreading distance of ink.

The term "wetting and spreading" is used to indicate the movement of a liquid in the plane direction of the base material. The term "penetration" is also used to indicate the movement of a liquid in the thickness direction of the base material as well as in the plane direction of the base material. While the term "penetration" includes the concept of the three-dimensional movement of a liquid, the term "wetting and spreading" indicates the concept of the two-dimensional movement of a liquid along the plane direction of the base material. The term "bleeding" indicates the concept of the two-dimensional movement of a liquid along the plane direction of the base material, similarly to the "wetting and spreading". The "wetting and spreading" can be construed as synonymous with the "bleeding".

[For Influence of Thickness of Yarn on Wetting and Spreading of Ink]

Figure 26:
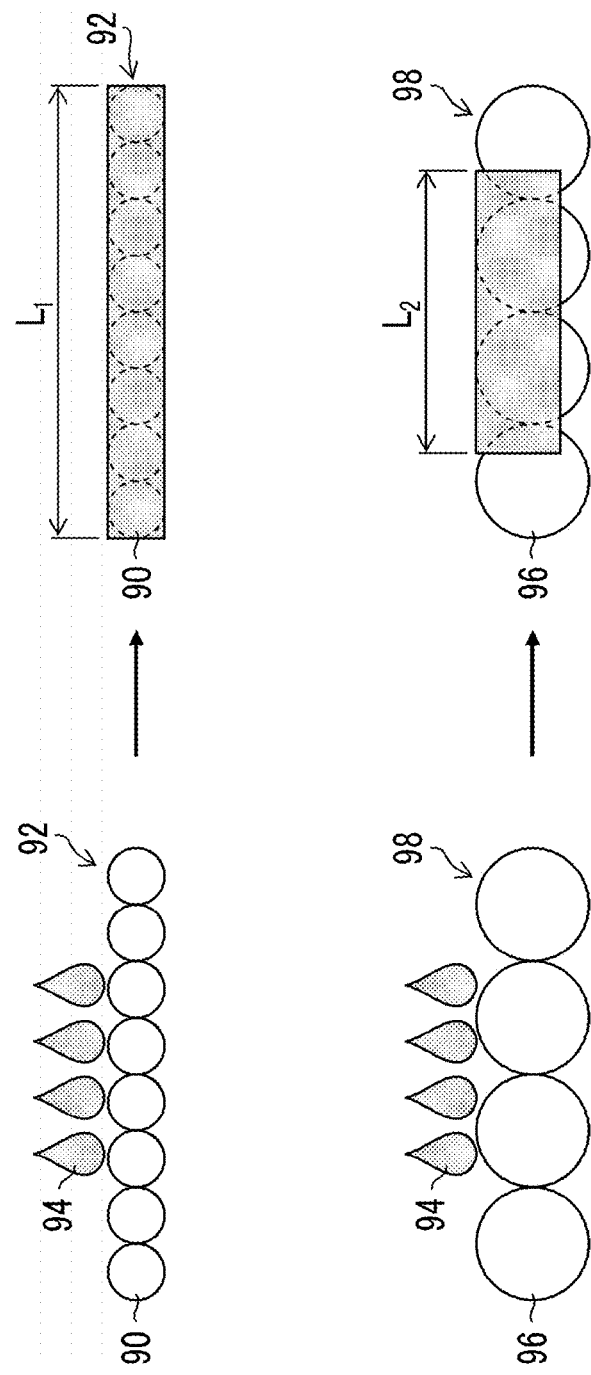
FIG. 26 is a diagram schematically illustrating the relationship between the thickness of yarn and a wetting and spreading distance of ink.

FIG. 26 is a diagram schematically illustrating the relationship between the thickness of yarn and the wetting and spreading distance of ink. FIG. 26 schematically illustrates a cross-sectional view of two types of base materials with different year thicknesses. The upper side of FIG. 26 illustrates an aspect in which ink 94 is applied to a base material 92 made of a relatively thin yarn 90. The upper right side of FIG. 26 illustrates an aspect in which the ink 94 penetrates through the base material 92 and wets and spreads. The lower side of FIG. 26 illustrates an aspect in which the ink 94 is applied to a base material 98 made of a relatively thick yarn 96. The lower right side of FIG. 26 illustrates an aspect in which the ink 94 penetrates through the base material 98 and wets and spreads. The wetting and spreading distance $L_1$ of the ink 94 in the plane direction of the base material 92 made of the thin yarn 90 is longer than the wetting and spreading distance $L_2$ of the ink 94 in the plane direction of the base material 98 made of the thick yarn 96.

As can be seen from FIG. 26, in a case in which the thickness of the yarn is reduced, the thickness in the depth direction is reduced. The "depth direction" means the cross-sectional direction of the yarn in FIG. 26 and is the thickness direction of the base material. Therefore, in the base material having a smaller yarn thickness, the amount of ink that is likely to be present in the depth direction is more limited. Therefore, ink is not absorbed only in the depth direction. As a result, ink penetrates in the plane direction. That is, the wetting and spreading of ink in the plane direction increases.

The information of the thickness of the yarn can be useful to evaluate the wetting and spreading distance of ink. The thickness of the yarn is defined by a "count". In a case in which the count of the yarn used in the base material is known, it is possible to know the thickness of the yarn.

[For Influence of Weave Type on Wetting and Spreading of Ink]

The amounts of warp and weft on the printing surface are different from each other according to the type of weave. For example, in twill, the ratio of the warp to the weft is about 1:2. In satin weave, the ratio of the warp to the weft is about 1:4. In a case in which the ratio of the warp to the weft on the printing surface varies, there is a difference between the amounts of ink received by the warp and the weft. As the amount of ink received increases, the amount of wetting and spreading increases. Therefore, a difference in the ink penetration distance between the warp and the weft occurs according to the weave type. As such, the weave type is related to the direction dependence of the wetting and spreading of ink and is information that is useful to specify the direction in which bleeding is likely to occur.

In a case in which ink droplets are applied to the base material that depends on the direction in which wetting and spreading are likely to occur, the ink does not wet and spread in a circular shape on the base material, but wets and spreads in a shape close to a rectangle extending in the direction in which wetting and spreading are likely to occur. There is a yarn type in which ink is likely to wet and spread. Wetting and spreading are more likely to occur in the warp than in the weft according to the type of weave.

The micrograph on the right side of FIG. 4 which has been described shows the result of printing on a polyester cloth produced by satin weave. As can be seen from the micrograph, in the case of the satin weave, the penetration distance in the warp is significantly longer than that in the weft.

[Relationship Between Base Material Information and CMYK Printing Pattern Control]

Figure 27:
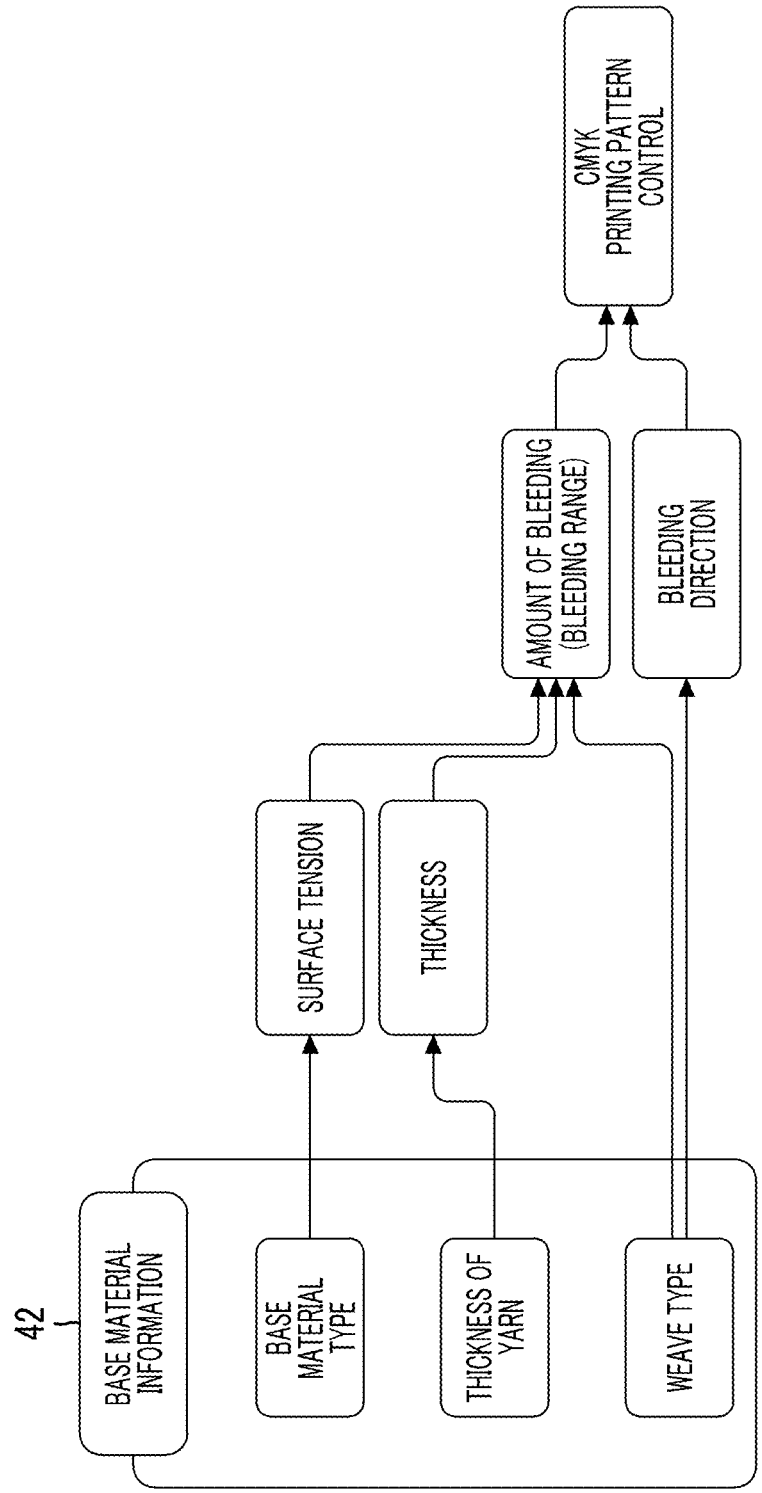
FIG. 27 is a diagram schematically illustrating the relationship between base material information and the printing pattern control of each color ink.

FIG. 27 is a diagram schematically illustrating the relationship between base material information and CMYK printing pattern control. A combination of a base material type, the thickness of yarn, and weave type information can be used as the base material information 42. The base material type is information for specifying the type of fiber. Specifically, the base material type is yarn type information for specifying the type of warp and weft. The base material type is related to surface tension. The thickness of yarn is related to a thickness. The wetting and spreading of ink for each base material can be evaluated by a combination of the amount of bleeding and a bleeding direction. The amount of bleeding may be restated as, for example, a bleeding range, a wetting and spreading range, a wetting and spreading distance, or a penetration distance. The bleeding direction may be restated as, for example, a wetting and spreading direction or a penetration direction. The weave type is related to the bleeding direction and the amount of bleeding.

In this embodiment, CMYK printing pattern control is performed on the basis of the base material information 42, considering the amount of bleeding and the bleeding direction which are the wetting and spreading characteristics of ink in the base material.

[Overview Image of Printing Process According to Embodiment]

Here, the overview image of an image formation process performed by the ink jet printing system 10 according to the embodiment will be described with reference to simple diagrams.

Figure 28:
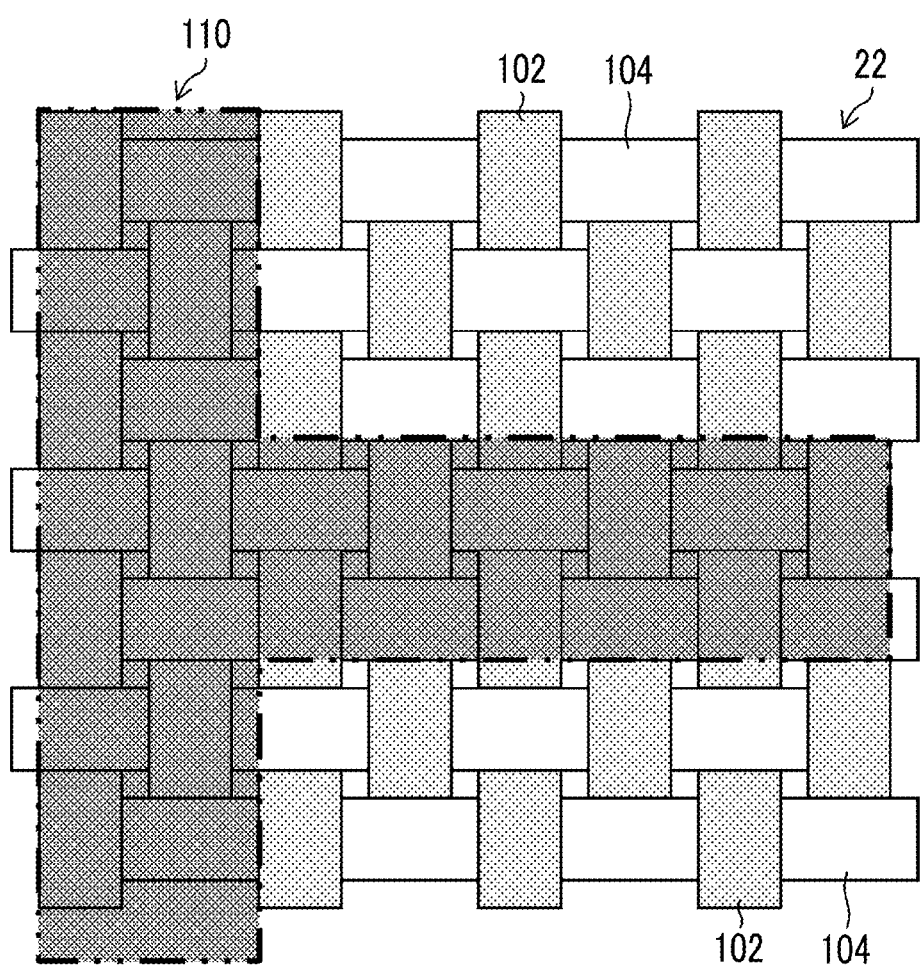
FIG. 28 is a diagram illustrating a target printed matter.

FIG. 28 is a diagram illustrating a target printed matter. A target pattern image 110 is printed on the base material 22. In FIG. 28, a gray tone is attached to a warp 102 in order to display the warp 102 and a weft 104 of the base material 22 so as to be easily distinguished from each other.

Figure 29:
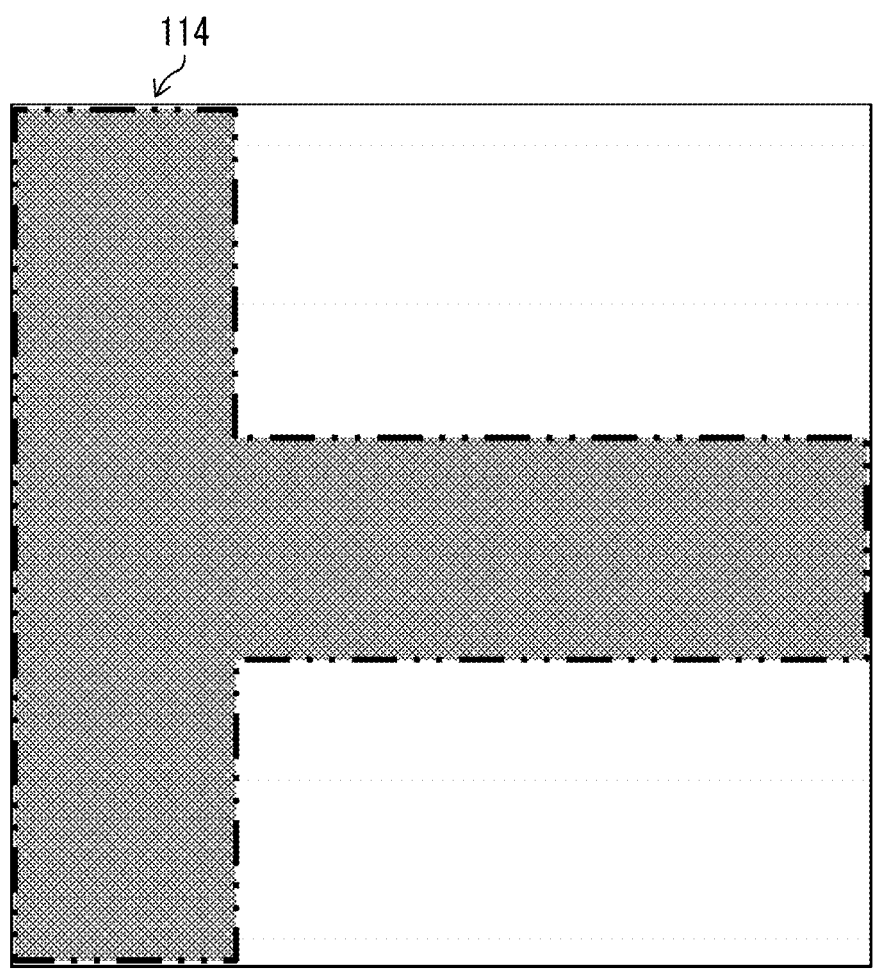
FIG. 29 is a diagram illustrating original image data which is the source of the image to be achieved.

FIG. 29 illustrates an original image 114 which is the original image data of the image 110 to be achieved in FIG. 28. The original image 114 illustrated in FIG. 29 corresponds to the image data 40 described in FIG. 1.

Figure 30:
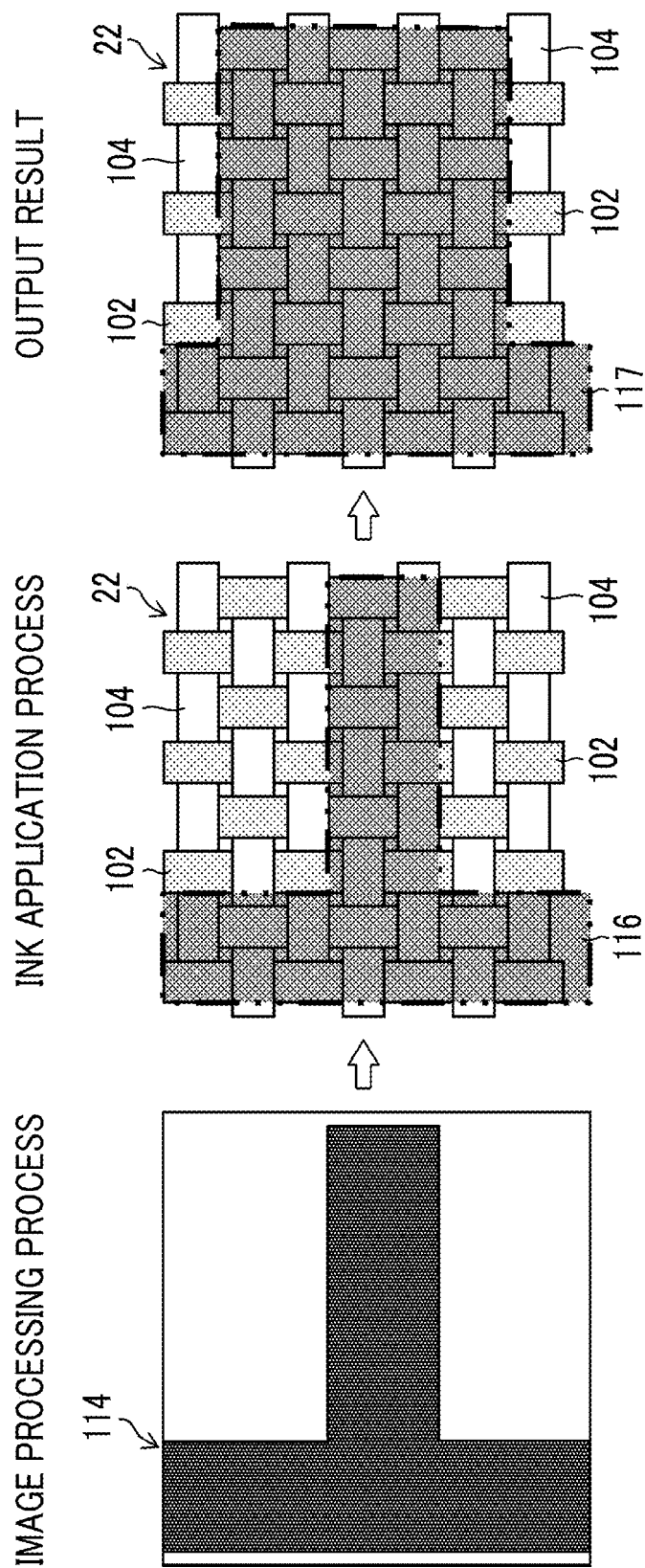
FIG. 30 is an image diagram illustrating a comparative example in which printing is performed without bleeding prevention image processing.

FIG. 30 is an image diagram in a comparative example in which the original image 114 is printed without applying the bleeding prevention image processing P110. Here, an example of the base material 22 in which the amount of bleeding in the vertical direction is more than that in the horizontal direction will be described. In the comparative example illustrated in FIG. 30, in the image processing process, the original image 114 is not changed and halftone processing is performed for the original image 114 to generate print data for ink jet printing. In a case in which ink jet printing is performed on the basis of the print data in the ink application process, bleeding in the warp direction is significant in the output result. As a result, printing quality is degraded.

A printed image 116 illustrated at the center of FIG. 30 shows an ink application range immediately after ink jet printing. An output result image 117 illustrated on the right side of FIG. 30 shows that the quality of a reproduced image is degraded by ink bleeding, particularly, bleeding in the warp direction.

Figure 31:
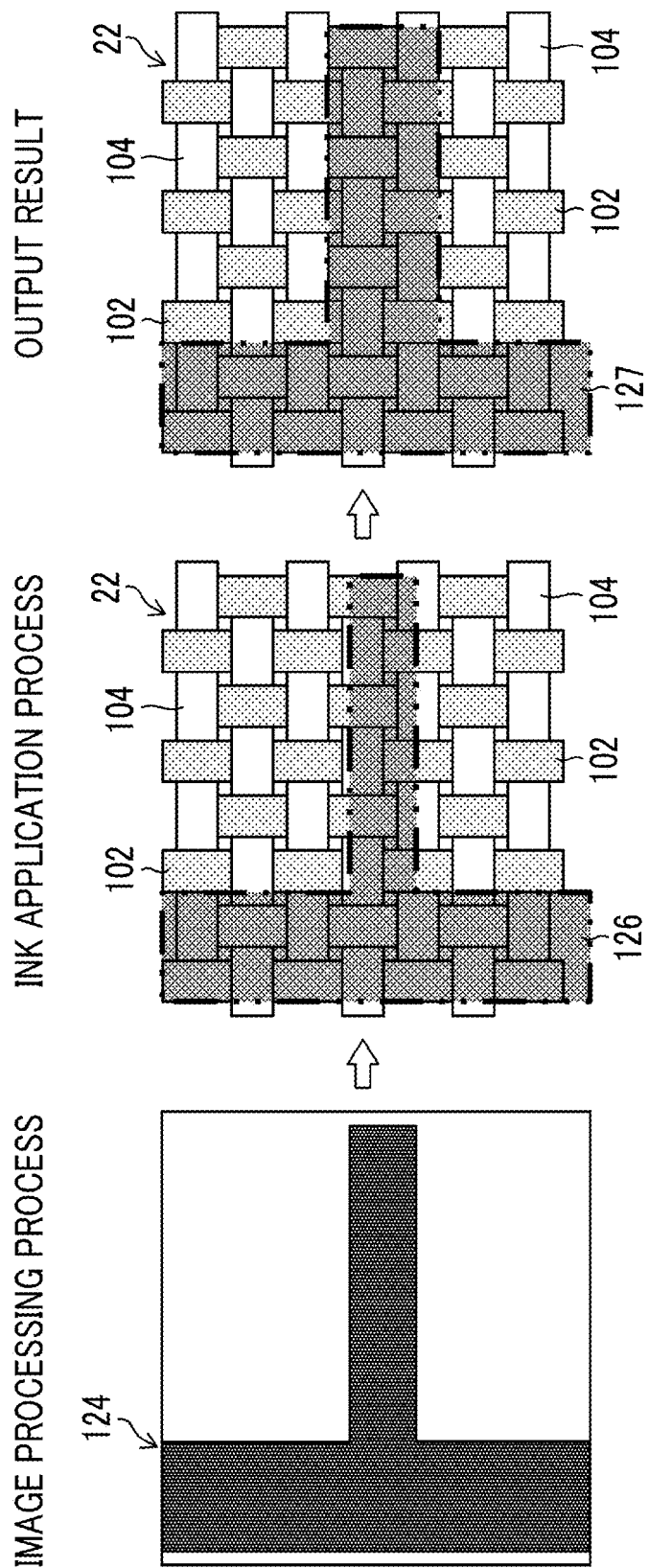
FIG. 31 is an image diagram illustrating an example of a printing process according to the embodiment.

FIG. 31 is an image diagram illustrating an example of a printing process implemented by the embodiment. In FIG. 31, in the image processing process, the bleeding prevention image processing P110 is performed and a bleeding-prevented image 124 subjected to image processing considering the wetting and spreading of ink is generated from the original image 114. In the example illustrated in FIG. 31, the bleeding-prevented image 124 in which the position of an image boundary intersecting the vertical direction of the original image 114 has been corrected considering the characteristics of the base material 22 in which bleeding is likely to occur in the vertical direction is illustrated.

Halftone processing is performed for the bleeding-prevented image 124 to generate print data for ink jet printing. In a case in which ink jet printing is performed on the basis of the print data generated from the bleeding-prevented image 124 in the ink application process, a target output result is generated by the wetting and spreading of ink as a result.

A printed image 126 illustrated at the center of FIG. 31 shows an ink application position immediately after printing is performed by the ink application process. An output result image 127 illustrated on the right side of FIG. 31 is an image close to the image 110 illustrated in FIG. 28 which is to be achieved by the wetting and spreading of ink after printing.

[Example of Configuration of Image Processing Apparatus]

Figure 32:
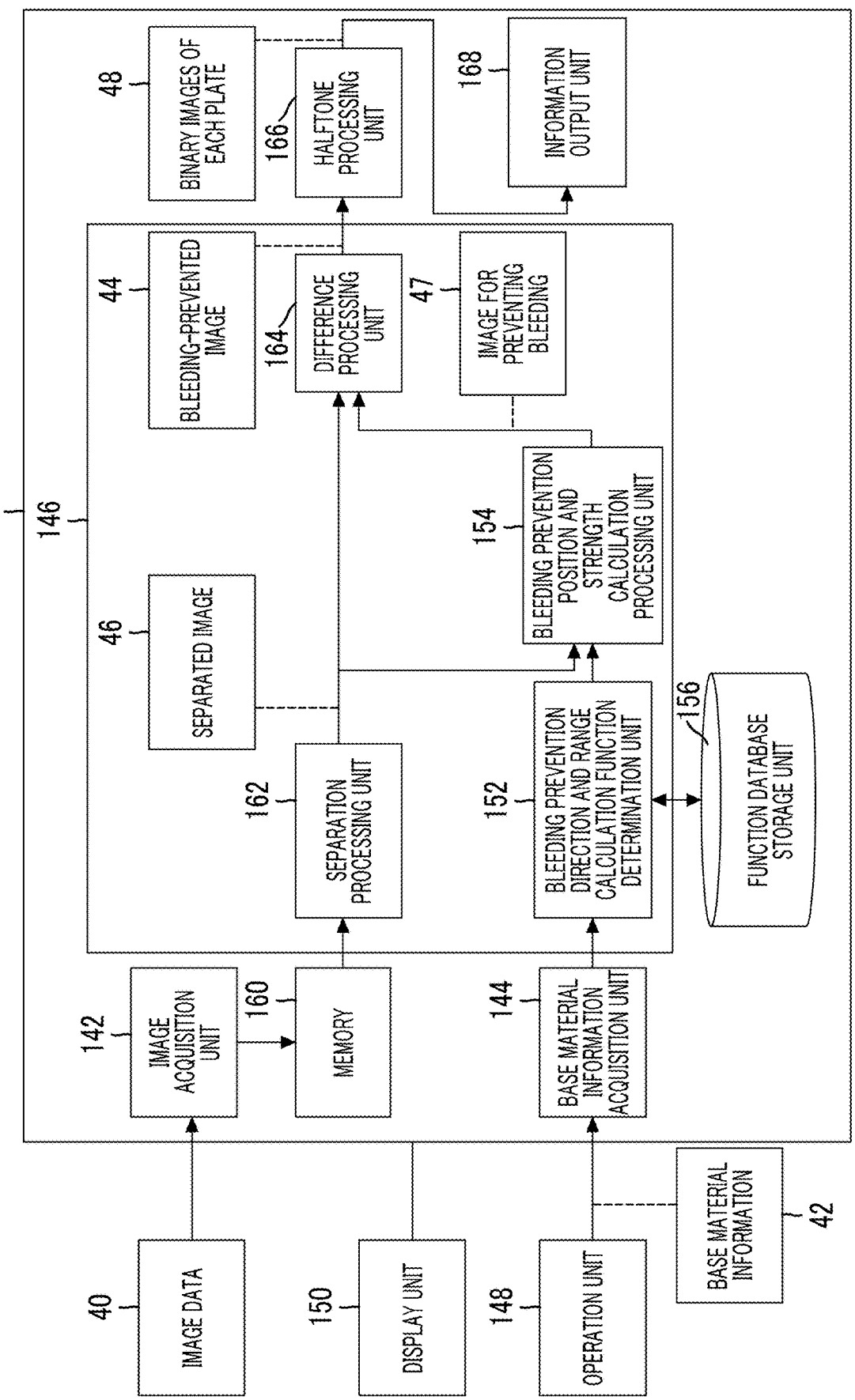
FIG. 32 is a functional block diagram illustrating the image processing apparatus according to the embodiment.

FIG. 32 is a block diagram illustrating the functional configuration of the image processing apparatus 12. The image processing apparatus 12 comprises an image acquisition unit 142, a base material information acquisition unit 144, and a bleeding prevention image processing unit 146. The image acquisition unit 142 is an image input interface unit that acquires the image data 40. The image acquisition unit 142 can include a data input terminal that acquires the image data 40 from the outside or another signal processing unit in the apparatus. The image acquisition unit 142 may be a wired or wireless communication interface unit, a media interface unit that reads and writes data from and to an external storage device, such as a memory card, or an appropriate combination of these aspects.

The base material information acquisition unit 144 is an information input interface unit that acquires the base material information 42. The image processing apparatus 12 comprises an operation unit 148 and a display unit 150. The operation unit 148 is means that is used by the user to perform an operation of inputting various kinds of information. The operation unit 148 receives an operation of inputting the base material information 42 from the user. The operation unit 148 may be various types of input devices, such as a keyboard, a mouse, a touch panel, a trackball, and an operation button, and an appropriate combination thereof.

For example, display devices using various display methods, such as a liquid crystal display and an organic electroluminescence (EL) display, can be used as the display unit 150. For example, the user can use the operation unit 148 and the display unit 150 to input commands to the image processing apparatus 12 and to perform a setting operation. A combination of the operation unit 148 and the display unit 150 functions as a user interface. The user can use the operation unit 148 to input various kinds of information and to operate, for example, the image processing apparatus 12 or the ink jet printing apparatus 16, while checking the content displayed on a screen of the display unit 150. In addition, the user can check, for example, the state of the system through the display unit 150.

The bleeding prevention image processing unit 146 is a processing unit that performs the bleeding prevention image processing P110 described in FIG. 8. The bleeding prevention image processing unit 146 includes a bleeding prevention direction and range calculation function determination unit 152, a bleeding prevention position and strength calculation processing unit 154, a separation processing unit 162, and a difference processing unit 164. The bleeding prevention direction and range calculation function determination unit 152 performs the bleeding prevention direction and range calculation function generation process P122 described in FIG. 8. The bleeding prevention direction and range calculation function determination unit 152 determines the bleeding prevention direction and range calculation function 50 corresponding to the base material information 42, using the information stored in a function database storage unit 156.

The function database storage unit 156 stores a function database which is an aggregate of function information related to a plurality of types of base materials illustrated in FIGS. 9 to 14. The function database storage unit 156 may be provided in the image processing apparatus 12 or may be an external storage device connected to the image processing apparatus 12. In addition, the function database may be stored in other computers (not illustrated) or the image processing apparatus 12 may acquire information from the function database through a network. The network may be a local area network, a wide area network, or a combination thereof.

The bleeding prevention position and strength calculation processing unit 154 functions as arithmetic processing means for performing the bleeding prevention position and strength calculation process P124 described in FIG. 8.

The separation processing unit 162 performs the separation process P120 for the image data 40 to generate C, M, Y, and K separated images 46. The separated images 46 of each color generated by the separation processing unit 162 are transmitted to the bleeding prevention position and strength calculation processing unit 154 and the difference processing unit 164. The difference processing unit 164 performs the difference processing P126 described in FIG. 8.

The image processing apparatus 12 further comprises a memory 160, a halftone processing unit 166, and an information output unit 168. The image data 40 input through the image acquisition unit 142 is stored in the memory 160. The halftone processing unit 166 performs the halftone processing P130 for each of the C, M, Y, and K bleeding-prevented images 44 generated by the bleeding prevention image processing unit 146 to generate binary images 48 of each plate. A predetermined halftone processing rule is applied to the halftone processing unit 166. Examples of the halftone processing rule include a dither method and an error diffusion method. The halftone processing rule may vary depending on, for example, image recording conditions or the content of image data.

The information output unit 168 is an output interface for outputting the information generated by the image processing apparatus 12. The binary images 48 of each plate are output to the printing control device 14 through the information output unit 168. The information output unit 168 may output information to the outside of the image processing apparatus 12 or may output information to, for example, other processing units of the image processing apparatus 12.

The memory 160 can be used as a work memory area that stores data required for the arithmetic processing of each processing unit of the bleeding prevention image processing unit 146 and the halftone processing unit 166 and the data of the processing results.

FIG. 33 is a block diagram illustrating the functional configuration of the bleeding prevention position and strength calculation processing unit 154. The bleeding prevention position and strength calculation processing unit 154 includes a filter processing unit 154A, an absolute value processing unit 154B, and an addition processing unit 154C. The filter processing unit 154A applies the filter function determined by the bleeding prevention direction and range calculation function determination unit 152 to the separated image 46 to perform filter processing. The absolute value processing unit 154B performs an absolute value calculation process that calculates an absolute value of an image signal value after the filter processing by the filter processing unit 154A. The image signal value after the filter processing means a filter output obtained by the filter processing of the filter processing unit 154A. The filter processing is performed for the separated image 46 with the longitudinal filter function and the absolute value of each pixel value after image conversion by the filter processing is calculated to obtain the image for preventing bleeding in the vertical direction. In addition, the filter processing is performed for the separated image 46 with the lateral filter function and the absolute value of each pixel value after image conversion by the filter processing is calculated to obtain the image for preventing bleeding in the horizontal direction.

The addition processing unit 154C performs an addition process of adding the image for preventing bleeding in the vertical direction and the image for preventing bleeding in the horizontal direction to generate the image 47 for preventing bleeding. The image 47 for preventing bleeding obtained by the addition process of the addition processing unit 154C is transmitted to the difference processing unit 164 illustrated in FIG. 32.

The bleeding prevention image processing unit 146, the bleeding prevention direction and range calculation function determination unit 152, the bleeding prevention position and strength calculation processing unit 154, the separation processing unit 162, the difference processing unit 164, and the halftone processing unit 166 of the image processing apparatus 12 are implemented by one central processing unit (CPU) or a plurality of CPUs and are operated by loading a program stored in a recording unit (not illustrated) of the image processing apparatus 12 to one CPU or a plurality of CPUs.

The image acquisition unit 142 corresponds to an example of image acquisition means. The base material information acquisition unit 144 corresponds to an example of base material information acquisition means. The bleeding prevention image processing unit 146 corresponds to an example of bleeding prevention image processing means. The bleeding prevention direction and range calculation function determination unit 152 corresponds to an example of function determination means. The bleeding prevention position and strength calculation processing unit 154 corresponds to an example of arithmetic processing means. The function database storage unit 156 corresponds to an example of function database storage means. The separation processing unit 162 corresponds to an example of separation processing means. The difference processing unit 164 corresponds to an example of difference processing means. The halftone processing unit 166 corresponds to an example of halftone processing means. The operation unit 148 corresponds to an example of operation means. The display unit 150 corresponds to an example of display means. The filter processing unit 154A corresponds to an example of filter processing means. The absolute value processing unit 154B corresponds to an example of absolute value processing means. The addition processing unit 154C corresponds to an example of addition processing means.

[Image Processing Method According to Embodiment]

FIG. 34 is a flowchart illustrating an image processing process according to the embodiment. Each step of the flowchart illustrated in FIG. 34 is performed by the image processing apparatus 12.

In Step S11, the image processing apparatus 12 acquires the base material information 42. Step S11 corresponds to an example of a base material information acquisition step.

In Step S12, the image processing apparatus 12 acquires the image data 40. Step S12 corresponds to an example of an image acquisition step.

In Step S13, the bleeding prevention direction and range calculation function determination unit 152 of the image processing apparatus 12 determines a longitudinal filter and a lateral filter on the basis of the base material information 42. Step S13 corresponds to an example of a function determination step.

In Step S14, the separation processing unit 162 of the image processing apparatus 12 performs the separation process for the image data 40 to generate a C image, an M image, a Y image, and a K image.

In Step S15, the bleeding prevention position and strength calculation processing unit 154 of the image processing apparatus 12 performs the filter processing of applying the longitudinal filter and the lateral filter determined in Step S13 to each of the C image, the M image, the Y image, and the K image. The process in Step S15 is performed by the filter processing unit 154A described in FIG. 33.

In Step S16, the bleeding prevention position and strength calculation processing unit 154 of the image processing apparatus 12 calculates the absolute value of a filter output which is the result of the filter processing in Step S15. The process in Step S16 is performed by the absolute value processing unit 154B described in FIG. 33.

The image for preventing bleeding in the vertical direction is obtained by performing the filter processing in Step S15 with the longitudinal filter and performing the absolute value calculation process in Step S16 for the filter output. In addition, the image for preventing bleeding in the horizontal direction is obtained by performing the filter processing in Step S15 with the lateral filter and performing the absolute value calculation process in Step S16 for the filter output. The image for preventing bleeding in the vertical direction and the image for preventing bleeding in the horizontal direction for each of C, M, Y, and K are generated by the processes in Steps S15 and S16.

In Step S17, the bleeding prevention position and strength calculation processing unit 154 of the image processing apparatus 12 adds the image for preventing bleeding in the vertical direction and the image for preventing bleeding in the horizontal direction for each color to generate the images of each color for preventing bleeding. The process in Step S17 is performed by the addition processing unit 154C described in FIG. 33.

In Step S18, the bleeding prevention position and strength calculation processing unit 154 of the image processing apparatus 12 subtracts the images of each color for preventing bleeding from the C image, the M image, the Y image, and the K image to generate bleeding-prevented images of each color. The process in Step S18 is performed by the difference processing unit 164 described in FIG. 32. Steps S15 to S18 correspond to an example of a bleeding prevention image processing step.

In Step S19, the halftone processing unit 166 of the image processing apparatus 12 performs halftone processing for the bleeding-prevented images of each color to generate binary images for printing each color. A binary image for printing C, a binary image for printing M, a binary image for printing Y, and a binary image for printing K are generated by Step S19.

In Step S20, the image processing apparatus 12 outputs the binary images for printing each color generated in Step S21. In a case in which the output process in Step S20 is completed, the flowchart illustrated in FIG. 34 ends.

The order of the steps of the flowchart illustrated in FIG. 34 is not limited to the example illustrated in FIG. 34 and the execution order can be changed in the range in which the progress can proceed. For example, Step S11 and Step S12 can be interchanged.

In FIG. 34, Steps S13 and S14 are illustrated in parallel. However, the process in Step S14 may be performed after Step S13 or the process in Step S13 may be performed after Step S14.

[Printing Process Using Ink Jet Printing Apparatus 16]

Figure 35:
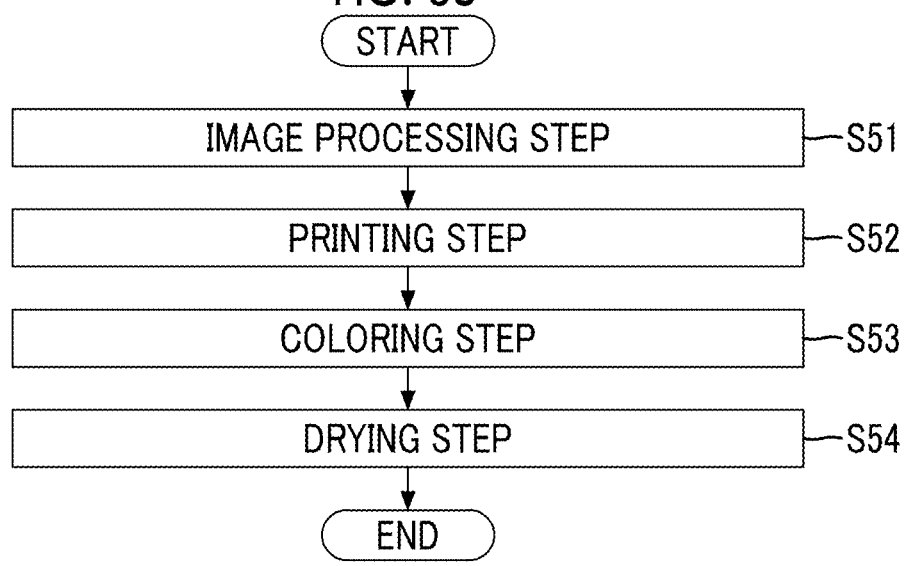
FIG. 35 is a flowchart illustrating an example of a printing process using the ink jet printing apparatus.

FIG. 35 is a flowchart illustrating an example of a printing process using the ink jet printing apparatus 16 according to this embodiment. The printing process illustrated in FIG. 35 includes an image processing step (Step S51), a printing step (Step S52), a coloring step (Step S53), and a drying step (Step S54).

The image processing step (Step S51) is a step of performing the image processing process described in the flowchart of FIG. 34. In Step S51, the image processing apparatus 12 performs bleeding prevention image processing for input image data to generate the binary images of C, M, Y, and K plates.

The printing step (Step S52) is a step of controlling the ink jetting head 20 on the basis of the binary images for printing C, M, Y, and K generated by the image processing apparatus 12 such that ink is applied to the base material 22. The binary images for printing C, M, Y, and K correspond to image data for defining the ink application position and the ink non-application position. The printing control device 14 generates a recording signal of the ink jetting head 20 on the basis of the binary images for printing C, M, Y, and K and controls the jetting of each color ink from the ink jetting head 20. The ink jetting head 20 jets ink to the base material 22 to print the pattern of the image data 40 on the base material 22. The printing control device 14 corresponds to an example of "control means" for controlling the jetting of ink.

The coloring step (Step S53) is a processing step of fixing a color material of the ink applied to the base material to a fiber. Examples of the coloring step include a method using heated air, a method using atmospheric-pressure saturated steam, and a method using superheated steam. It is preferable to use the method using atmospheric-pressure saturated steam.

Here, a step of applying steam to the base material to which ink has been applied is used as the coloring step (Step S53). In the step of applying steam to the base material, the temperature and time of the steaming process vary depending on the type of coloring composition and the type of base material. The temperature of the steaming process is preferably in the range of 90° C. to 140° C. and more preferably in the range of 100° C. to 108° C. The time of the steaming process is preferably in the range of 1 minute to 60 minutes and more preferably in the range of 1 minute to 30 minutes.

A steam applying device used in the coloring step (Step S53) may be provided in the ink jet printing apparatus 16 or may be configured as a device provided separately from the ink jet printing apparatus 16.

The drying step (Step S54) is a step of drying the cleaned base material. A device, such as a drier, used in the drying step (Step S54) may be provided in the ink jet printing apparatus 16 or may be configured as a device provided separately from the ink jet printing apparatus 16.

A drying step may be added between the printing step (Step S52) and the coloring step (Step S53) instead of the drying step in Step S54 or the drying steps may be combined with each other.

[Examples of Ink]

The ink for ink jet printing used in this embodiment can be produced by dissolving and/or dispersing a color material in a lipophilic medium or an aqueous medium. Ink using an aqueous medium is preferable. The color material is a dye or a pigment.

In this embodiment, it is possible to form an image using a monochromatic or full-color ink. A magenta ink, a cyan ink, and a yellow ink can be used to form a full color image. In addition, a black ink is further used to adjust the color. Red, green, orange, gray, white, gold, and transparent inks can also be used. The color material that can be applied is not particularly limited. For example, the color materials described in paragraphs [0237] to [0240] of JP2014-005462A can be used.

Further, the ink for ink jet printing can contain a solvent and a surfactant in addition to a color material in order to impart ink suitability, printing suitability, and image fastness.

An aqueous medium, more preferably, water or an aqueous organic solvent is used as the solvent. Examples of the aqueous organic solvent include polyhydric alcohols, such as diethylene glycol and glycerin, amines, monohydric alcohols, and alkyl ethers of polyhydric alcohols. Further, each compound which is given as an example of the water-miscible organic solvent described in paragraph [0076] of JP2002-371079A is preferable.

The content of the organic solvent in the ink is preferably equal to or greater than 10 mass % and equal to or less than 60 mass % with respect to the total mass of the ink.

Any of cationic, anionic, amphoteric, and nonionic surfactants can be used as the surfactant. The ink for ink jet printing used in this embodiment can contain other additives in the range that the effect of the invention is maintained if necessary.

It is preferable that the viscosity of the ink is equal to or less than 30 mPa·s. In addition, the surface tension of the ink is equal to or greater than 25 mN/m and equal to or less than 70 mN/m. The viscosity and the surface tension can be adjusted by adding one or more of various types of additives, for example, a viscosity adjuster, a surface tension regulator, a specific resistance adjuster, a film regulator, an ultraviolet absorber, an antioxidant, a fading inhibitor, fungicide, a rust inhibitor, a dispersant, and a surfactant.

[Hardware Configuration of Image Processing Apparatus]

Figure 36:
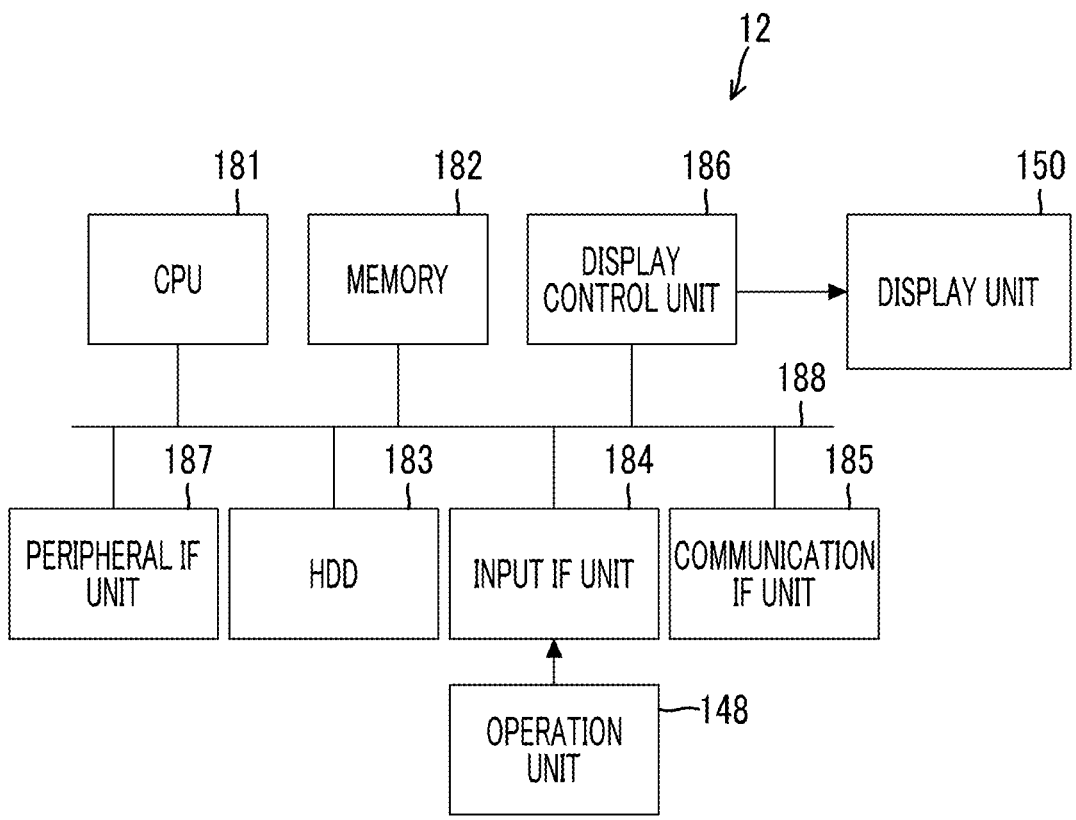
FIG. 36 is a block diagram illustrating an example of the hardware configuration of the image processing apparatus.

FIG. 36 is a block diagram illustrating an example of the hardware configuration of the image processing apparatus 12. The image processing apparatus 12 can be implemented by a computer. There are various types of computers, such as a desktop type, a notebook type, and a tablet type. In addition, the computer may be a server computer or a microcomputer.

The image processing apparatus 12 comprises a central processing unit (CPU) 181, a memory 182, a hard disk drive (HDD) 183, an input interface unit 184, a communication interface unit 185 for network connection, a display control unit 186, a peripheral interface unit 187, and a bus 188. In FIG. 36, the notation of "IF" indicates an "interface".

The hard disk drive 183 stores various kinds of programs or data required for image processing. For example, the function database described in FIGS. 9 to 14 can be stored in the hard disk drive 183. A program stored in the hard disk drive 183 is loaded to the memory 182 and the CPU 181 executes the program such that the computer functions as various means defined by the program. The memory 182 functions as the memory 160 described in FIG. 32.

The operation unit 148 is connected to the input interface unit 184. The display unit 150 is connected to the display control unit 186.

[Another Example of Configuration of Ink Jet Printing Apparatus]

Figure 37:
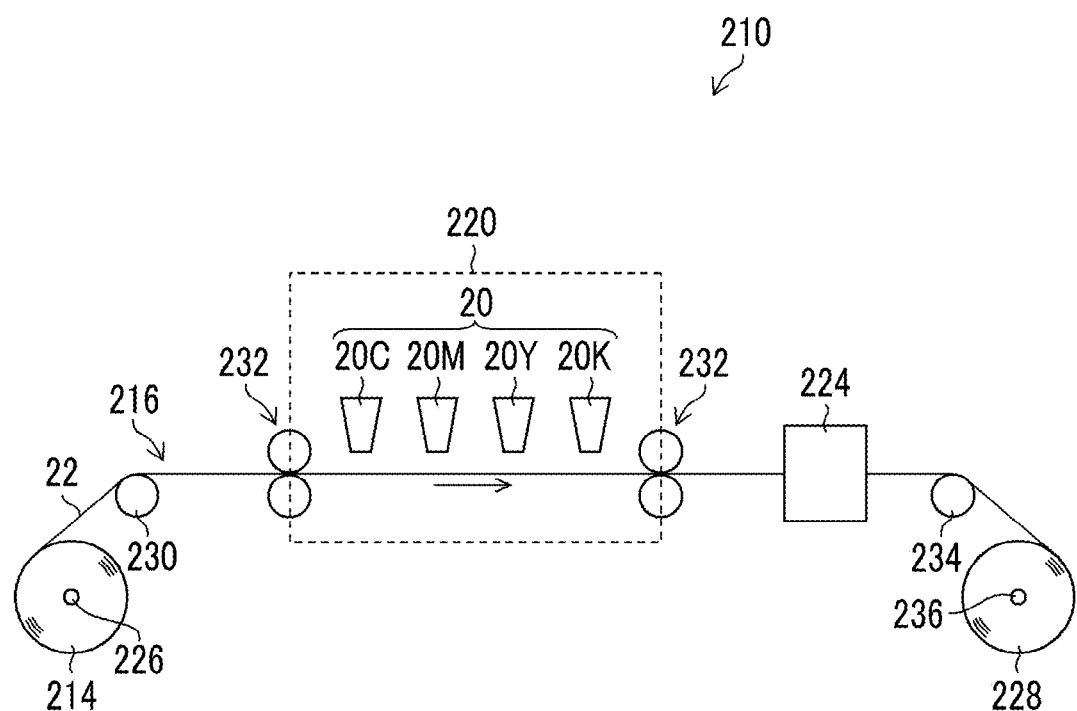
FIG. 37 is a diagram illustrating another example of the configuration of the ink jet printing apparatus.

FIG. 37 is a diagram illustrating another example of the configuration of the ink jet printing apparatus. An ink jet printing apparatus 210 illustrated in FIG. 37 comprises a supply-side roll 214, a base material transportation unit 216, an ink application unit 220, a post-treatment unit 224, and a winding roll 228. The supply-side roll 214 is an example of a base material supply unit. The base material transportation unit 216 is an example of a base material transportation mechanism. The winding roll 228 is an example of a base material collection unit.

The supply-side roll 214 has a core 226 around which the base material 22 is wound. The supply-side roll 214 is supported by a supporting member (not illustrated) so as to be rotatable about the core 226 as a rotation axis.

The base material transportation unit 216 includes a transportation roller 230, a plurality of nip roller pairs 232, and a tension roller 234. The base material transportation unit 216 transports the base material 22 drawn from the supply-side roll 214 to the winding roll 228 through the ink application unit 220, and the post-treatment unit 224.

The total length of the transportation roller 230 in the longitudinal direction corresponds to the total length of the base material 22 in the width direction. The longitudinal direction of the transportation roller 230 is parallel to the axial direction of the transportation roller 230. The width direction of the base material 22 is a base material width direction perpendicular to the transportation direction of the base material 22.

The transportation roller 230 supports the rear surface of the base material 22 drawn from the supply-side roll 214. The rear surface of the base material 22 is opposite to a printing surface which is an image formation surface of the base material 22. The transportation roller 230 may have a structure in which a plurality of rollers are arranged in the longitudinal direction.

The nip roller pairs 232 are provided on the upstream and downstream sides of the ink application unit 220 in the base material transportation direction. FIG. 37 illustrates an aspect in which the nip roller pairs 232 are provided on the upstream and downstream sides of the ink application unit 220 in the base material transportation direction.

The tension roller 234 applies tension to the base material 22 transported by the base material transportation unit 216 in the direction from the upstream side to the downstream side in the base material transportation direction. In addition, the tension roller 234 supports the rear surface of the base material 22.

The ink application unit 220 comprises the C ink jetting head 20C, the M ink jetting head 20M, the Y ink jetting head 20Y, and the K ink jetting head 20K. The ink application unit 220 forms an image on the base material 22 using at least one of the C ink, the M ink, the Y ink, or the K ink.

The post-treatment unit 224 is a processing unit that performs a post-treatment for the base material 22 to which ink has been applied. The post-treatment includes at least one of a steam applying process or a drying process. The post-treatment unit 224 may have a configuration in which it comprises one of a steam applying device and a drying device which are not illustrated or a combination of them.

The winding roll 228 is supported so as to be rotatable about a core 236 as a rotation axis. The base material 22 can be wound around the winding roll 228. The base material 22 on which the image has been formed and which has been subjected to the post-treatment is wound around the core 236. In this way, the winding roll 228 accommodates the base material 22.

[Schematic Configuration of Control System]

Figure 38:
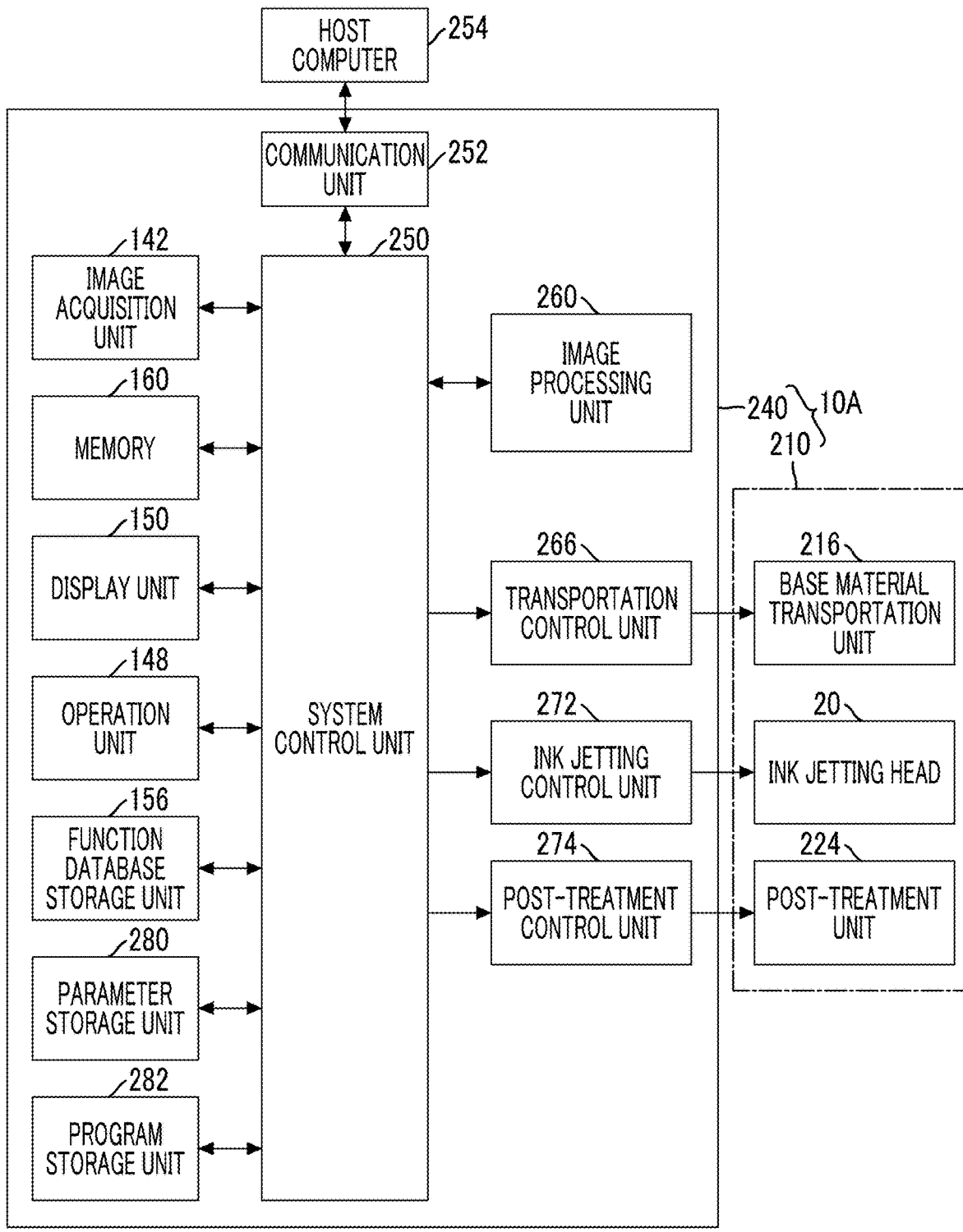
FIG. 38 is a block diagram illustrating the configuration of a control system of the ink jet printing system.

FIG. 38 is a block diagram illustrating the schematic configuration of a control system of an ink jet printing system. In FIG. 38, elements having the same or similar configurations as those illustrated in FIG. 1, FIG. 32, FIG. 33, and FIG. 37 are denoted by the same reference numerals and the description thereof will not be repeated. An ink jet printing system 10A illustrated in FIG. 38 includes a printing control device 240 and an ink jet printing apparatus 210. The printing control device 240 is a control device having the image processing function of the image processing apparatus 12 and the control function of the printing control device 14 illustrated in FIG. 1.

The printing control device 240 comprises a system control unit 250 and a communication unit 252. The system control unit 250 can include a CPU a read only memory (ROM), and a random access memory (RAM). The system control unit 250 functions as an overall control unit that controls the overall operation of each unit of the ink jet printing system 10A. In addition, the system control unit 250 can function as an arithmetic unit that performs various types of arithmetic processing.

The communication unit 252 comprises a communication interface based on a wired or wireless data communication standard. The communication unit 252 can transmit and receive data to and from a host computer 254 connected through the communication interface.

The printing control device 240 comprises the image acquisition unit 142, the memory 160, and an image processing unit 260. The image acquisition unit 142 acquires image data transmitted from the host computer 254 through the communication unit 252. An example of the image data is raster data in a serial format. The memory 160 functions as a storage unit that temporarily stores various kinds of data including image data. Data is written to or read from the memory 160 through the system control unit 250. The image data which has been transmitted from the host computer 254 through the communication unit 252 and then acquired by the image acquisition unit 142 is temporarily stored in the memory 160.

The image processing unit 260 performs processes, such as a separation process, a grayscale image generation process, a pretreatment liquid image generation process, and halftone processing, for the image data acquired by the image acquisition unit 142 to generate dot pattern images for printing C, M, Y, and K. That is, the image processing unit 260 has the processing functions of the bleeding prevention image processing unit 146 and the halftone processing unit 166 described in FIGS. 32 and 33. In addition, the image processing unit 260 may have the processing function of a correction processing unit that performs a correction process for image data of each of C, M, Y, and K. Examples of the correction process include a gamma correction process, a density variation correction process, and an abnormal nozzle correction process.

The printing control device 240 comprises the function database storage unit 156, the operation unit 148, and the display unit 150. An operation screen for receiving the input of base material information is displayed on the display unit 150. The user operates the operation unit 148 to input base material information.

The system control unit 250 transmits the base material information input from the operation unit 148 to the image processing unit 260. In addition, the system control unit 250 reads the data of the corresponding function from the function database storage unit 156 on the basis of the base material information input from the operation unit 148 and supplies the data of the function to the image processing unit 260.

The printing control device 240 comprises a transportation control unit 266, an ink jetting control unit 272, and a post-treatment control unit 274. The transportation control unit 266 controls the operation of the base material transportation unit 216 on the basis of a command signal transmitted from the system control unit 250. The transportation control unit 266 controls the start of the transportation of the base material 22, the stop of the transportation of the base material 22, and the transportation speed of the base material 22. The transportation control unit 266 controls the rotation speed of the transportation roller 230 and the nip pressure of the nip roller pairs 232 on the basis of the transportation conditions of the base material 22 and the image formation conditions of the ink jetting head 20.

The ink jetting control unit 272 controls an ink jetting operation of the ink jetting head 20 on the basis of the binary image data of each of the C, M, Y, and K plates generated by the image processing unit 260.

The post-treatment control unit 274 controls a post-treatment operation of the post-treatment unit 224 on the basis of a command from the system control unit 250. The post-treatment control unit 274 controls the start time of the operation of the post-treatment unit 224, the end time of the operation of the post-treatment unit 224, the processing temperature of the post-treatment unit 224, and other processing conditions.

The printing control device 240 comprises a parameter storage unit 280 and a program storage unit 282. The parameter storage unit 280 stores various parameters used to control the ink jet printing apparatus 210. Various parameters stored in the parameter storage unit 280 are read through the system control unit 250 and are then set in each unit of the device.

The program storage unit 282 stores programs used to implement the functions of each unit of the printing control device 240. Various programs stored in the program storage unit 282 are read through the system control unit 250 and are then set in each unit of the device.

In FIG. 38, each unit for each function is illustrated. The units illustrated in FIG. 38 can be appropriately integrated, separated, used in two or more ways, or omitted. For example, some or all of the transportation control unit 266, the ink jetting control unit 272, and the post-treatment control unit 274 may be provided in the ink jet printing apparatus 210. In addition, for example, the communication unit 252 may function as the image acquisition unit 142.

The printing control device 240 including the image processing unit 260 corresponds to an example of an "image processing apparatus". A combination of the system control unit 250 and the ink jetting control unit 272 corresponds to an example of "control means".

[For Relationship Between Position of Sampling Region for Generating Filter and Filter Function]

The sampling region 64 described in FIG. 18 is set at a position including the right image boundary 62A of the rectangular pattern of the target image 62. However, the sampling region may be set at a position including the left image boundary of the rectangular pattern of the target image 62.

In this case, the shape of the graphs illustrated in FIGS. 20 to 23 is inverted with respect to the vertical axis. Therefore, filter functions in which the signs of the filter coefficients are inverted are obtained instead of the graphs of the filter functions illustrated in FIGS. 9 to 14. In a case in which the bleeding prevention direction and range calculation function 50 is generated using the obtained function data, for example, a lateral filter in which the sign of a filter coefficient is inverted is generated as illustrated in FIG. 39, instead of the lateral filter 50A illustrated in FIG. 15. The filters illustrated in FIGS. 15 and 39 are different from each other, but the output results of the bleeding prevention position and strength calculation process P124 using the two filters are the same. The reason is as follows. In the bleeding prevention position and strength calculation process P124, after the filter processing, the absolute value of the filter output image is calculated. Therefore, vertically symmetrical processing is performed in the vertical direction and horizontally symmetrical processing is performed in the horizontal direction.

Therefore, in a case in which the function data illustrated in FIGS. 9 to 14 is generated, it does not matter whether the sampling region 64 is set at the position including the right image boundary 62A of the rectangular pattern of the target image 62 or the position including the right image boundary. This holds for the longitudinal filter.

Modification Example 1

In the above-described embodiment, the example in which the bleeding prevention direction and range calculation function which is a bleeding prevention function is determined on the basis of the base material information including a base material type, the thickness of yarn, and weave type information has been described. However, in the invention, the bleeding prevention function may be determined on the basis of a specific information item of the base material information, particularly, only the information of the base material type.

Bleeding is most affected by the type of base material, that is, the base material type among the base material type, the thickness of yarn, and the weave type. Therefore, the information of all of the base material type, the thickness of yarn, and the weave type is not necessarily used as the base material information and the bleeding prevention function is determined on the basis of at least the information of the base material type, which makes it possible to obtain the performance of a corresponding problem solving effect.

The following process can be used as a specific example of the bleeding prevention direction and range calculation function generation process P122 in a case in which the information of only the base material type is given as the base material information.

In a case in which warp and weft are the same type, the following function generation rules can be used in the bleeding prevention direction and range calculation function generation process P122.

[Rule 1A] A filter function corresponding to the base material type in which warp and weft are the same type is selected from the filter functions prepared in advance.

[Rule 2A] A count of about 120 which is about the upper limit of the wetting and spreading of the yarn used in a general base material is selected as the thickness of the yarn.

[Rule 3A] Plain weave that is most frequently used is selected as the weave type.

It is possible to determine a longitudinal filter and a lateral filter which are the bleeding prevention direction and range calculation function on the basis of only the information of the base material type according to Rules 1A to 3A.

For example, in a case in which only the information of "cotton" indicating the base material type is given as the base material information, a lateral filter is generated from function data of "a count of 120" illustrated in FIG. 9 and a longitudinal filter is generated from function data of "a count of 120" illustrated in FIG. 10 according to Rules 1A, 2A, and 3A.

Modification Example 2

The following process can be used as another specific example of the bleeding prevention direction and range calculation function generation process P122 in a case in which the information of only the base material type is given as the base material information.

In a case in which warp and weft are different types, the following function generation rules can be used in the bleeding prevention direction and range calculation function generation process P122.

[Rule 1B] In a case in which only the information of a combination of different types of warp and weft is given, a filter function corresponding to a base material type in which the wetting and spreading of warp and weft are more significant is selected from the filter functions prepared in advance. As a selection method, a filter function having the larger sum of the absolute values of the filter coefficients is selected. As the filter function having the larger sum of the absolute values of the filter coefficients, a filter function corresponding to the base material in which bleeding is more significant is selected.

[Rule 2B] A count of about 120 which is about the upper limit of the wetting and spreading of the yarn used in a general base material is selected as the thickness of the yarn.

[Rule 3B] Plain weave that is most frequently used is selected as the weave type.

It is possible to determine a longitudinal filter and a lateral filter which are the bleeding prevention direction and range calculation function on the basis of only the information of the base material type according to Rules 1B to 3B.

For example, in a case in which only the information of a mixed weave of "cotton" and "polyester" indicating the base material type is given as the base material information, a lateral filter is generated from function data of "a count of 120" illustrated in FIG. 13 and a longitudinal filter is generated from function data of "a count of 120" illustrated in FIG. 14 according to Rules 1B, 2B, and 3B.

Modification Example 3

It is assumed that the wetting and spreading of ink are significant in only one of the warp direction and the weft direction depending on the type of cloth. In a case in which printing is performed on the cloth having the significant direction dependence, it is considered that the bleeding-prevented image 44 is generated using only one of the lateral filter or the longitudinal filter in the bleeding prevention image processing P110.

Modification Example 4

The invention is not limited to the configuration in which the base material information 42 is acquired through the user interface. A configuration may be used in which the base material information 42 is automatically acquired by an information reading device, such as a bar code reader, a radio tag reading device, or an imaging sensor, and/or a sensor. The information reading device and/or the sensor for automatically acquiring the base material information 42 corresponds to an example of base material information acquisition means.

Modification Example 5

In the above-described embodiment, the configuration in which the base material which is the medium to be printed is transported and the ink jetting head and the base material are relatively moved to form an image has been described. However, a configuration may be used in which the ink jetting head is moved with respect to the base material that is stationary and the ink jetting head and the base material are relatively moved to form an image. In addition, a line head of a single pass type is usually disposed along the base material width direction perpendicular to the base material transportation direction. However, the line head may be disposed along an oblique direction with a certain angle with respect to the base material width direction perpendicular to the base material transportation direction.

Modification Example 6

The functions of the image processing apparatus 12 may be implemented by one computer or a combination of a plurality of computers. For example, an image processing apparatus having a function of performing the bleeding prevention image processing P110 and an image processing apparatus having a function of performing the halftone processing P130 may be implemented by different computers. Further, for example, an image processing apparatus having a function of performing the separation process P120 and the halftone processing P130 and an image processing apparatus having a function of performing the bleeding prevention direction and range calculation function generation process P122, the bleeding prevention position and strength calculation process P124, and the difference processing P126 may be implemented by different computers. In addition, some or all of the processing functions of the image processing apparatus 12 or the image processing unit 260 may be implemented by an integrated circuit.

The configurations described in each embodiment or the matters described in the modification examples may be appropriately combined and used. In addition, some of the matters may be replaced with each other.

<For Program Causing Computer to Function as Image Processing Apparatus>

A program that causes a computer to implement the processing functions of the image processing apparatus 12 or the image processing unit 260 described in the above-mentioned embodiments and Modification Examples 1 to 6 can be recorded on a compact disc read-only memory (CD-ROM), a magnetic disk, or other computer-readable media which are non-transitory tangible information storage media and can be provided through the information storage medium. Instead of the aspect in which the program is stored in the non-transitory tangible information storage medium and is then provided, a program signal may be provided as a download service through a communication network such as the Internet.

In addition, some or all of the processing functions of the image processing apparatus 12 or the image processing unit 260 may be provided as a pretreatment liquid image application server and a service for providing the processing functions may be provided through the communication network.

Furthermore, some or all of the programs for implementing printing control including the image processing function described in the above-mentioned embodiment may be incorporated into a host control device, such as a host computer, or may be applied as an operating program of the CPU of the ink jet printing apparatus.

Advantages of Embodiments

The configurations described in each of the above-mentioned embodiments and the modification examples have the following advantages.

(1) An ink application pattern is determined according to the type of base material used for printing, considering the wetting and spreading characteristics of ink in the base material. According to the embodiments of the invention, the ink application position and the amount of ink applied which are capable of preventing the deterioration of image quality caused by bleeding are determined.

(2) According to the embodiments of the invention, it is possible to prevent the deterioration of image quality caused by bleeding, without using a pretreatment liquid.

(3) It is possible to omit the step of applying the pretreatment liquid. It is possible to reduce an environmental load and a device introduction cost, as compared to a system configuration using a pretreatment liquid.

[For Jetting Method of Ink Jet Head]

For a jetting method of each head of the ink jetting head 20, means for generating jetting energy is not limited to the piezoelectric element and various jetting energy generation elements, such as a heating element and an electrostatic actuator, can be used. For example, a method can be used which jets liquid droplets, using the pressure of film boiling by the heating of the liquid by the heating element. A corresponding jetting energy generation element is provided in a flow passage structure according to the jetting method of the liquid jetting head.

[For Terms]

The "warp" is synonymous with a vertical thread. The "weft" is synonymous with a horizontal thread. The warp direction and the weft direction are determined in a manufacturing process for weaving a woven fabric. The warp direction and the weft direction are not necessarily aligned with the vertical direction and the horizontal direction of the pattern at the time of printing. The relationship between the transportation direction of the base material and the warp direction or the weft direction of the base material in the ink jet printing apparatus may be specified and the image data 40 may be rotated if necessary to match the longitudinal and lateral conditions of the function data stored in the function database with the direction of the pattern at the time of printing, thereby generating the bleeding-prevented image 44.

The "twill" is also referred to as "twill weave". The satin weave is also referred to as "sateen weave".

The term "perpendicular" or "vertical" includes substantially perpendicular or vertical that exhibits substantially the same operation and effect as those in a case in which two elements intersect at a right angle in a case in which two elements intersect at an angle greater than 90 degrees or a case in which two elements intersect at an angle less than 90 degrees.

The term "parallel" includes substantial parallelism in which two directions are not parallel and which exhibits substantially the same operation and effect as those in a case in which two directions are parallel.

The term "wetting and spreading" may be replaced with and understood as "bleeding". In addition "the amount of bleeding" may be understood synonymously with "the amount of wetting and spreading" and "the bleeding range" may be understood synonymously with a "wetting and spreading range".

The "medium to be printed" is a medium used for printing and means a medium to which ink is applied to form an image. The term "medium to be printed" is synonymous with, for example, a printing medium, a medium to be recorded, a recording medium, a medium to be typed, a typing medium, a medium to be image-formed, an image formation medium, an image receiving medium, a base material to be printed, or a printing base material.

The "pattern" is interpreted in a broad sense and includes, for example, a color image, a black-and-white image, a monochrome image, a gradation image, and a uniform density (solid) image. The term "image" is not limited to a photographic image and is used as a comprehensive term including a pattern, a character, a symbol, a line drawing, a mosaic pattern, a color separation pattern, various other patterns, and combinations thereof.

The term "printing" includes the concept of image recording, image formation, drawing, print, textile printing, and typing. The term "textile printing" means printing on a cloth. The term "typing" includes the concept of image recording, image formation, and drawing. The "typing" includes the concept of digital printing based on digital data.

The term "printing apparatus" is synonymous with, for example, a "printing machine", a "printer", an "image recording apparatus", a "drawing apparatus", or an "image formation apparatus". Since the configuration of the embodiment is related to printing on a cloth, the "printing apparatus" can be understood as a "textile printing apparatus".

In the above-described embodiments of the invention, components can be appropriately changed, added, or deleted without departing from the scope and spirit of the invention. The invention is not limited to the above-described embodiments and various modifications and changes of the invention can be made by those skilled in the art within the technical scope of the invention.

EXPLANATION OF REFERENCES

- 10: ink jet printing system
- 10A: ink jet printing system
- 12: image processing apparatus
- 14: printing control device
- 16: ink jet printing apparatus
- 20: ink jetting head
- 20C: C ink jetting head
- 20M: M ink jetting head
- 20Y: Y ink jetting head
- 20K: K ink jetting head
- 22: base material
- 24: base material supply unit
- 26: base material transportation mechanism
- 28: base material collection unit
- 30: carriage
- 32: carriage driving mechanism
- 34: cotton cloth
- 35: region
- 36: weft
- 38: warp
- 39: dashed circle
- 40: image data
- 42: base material information
- 44: bleeding-prevented image
- 46: separated image
- 46C: C image
- 46M: M image
- 46Y: Y image
- 46K: K image
- 47: image for preventing bleeding
- 47C: image of C component for preventing bleeding
- 47M: image of M component for preventing bleeding
- 47Y: image of Y component for preventing bleeding
- 47K: image of K component for preventing bleeding
- 48: binary images of each plate
- 50A: lateral filter
- 50B: longitudinal filter
- 52: horizontal direction image for preventing bleeding
- 52C: image of C component for preventing bleeding in horizontal direction
- 52M: image of M component for preventing bleeding in horizontal direction
- 52Y: image of Y component for preventing bleeding in horizontal direction
- 52K: image of K component for preventing bleeding in horizontal direction
- 53: image for preventing bleeding in vertical direction
- 53C: image of C component for preventing bleeding in vertical direction
- 53M: image of M component for preventing bleeding in vertical direction
- 53Y: image of Y component for preventing bleeding in vertical direction
- 53K: image of K component for preventing bleeding in vertical direction
- 62: target image
- 62A: image boundary
- 64: sampling region
- 72: actual image
- 80: capillary
- 82: liquid
- 84: meniscus
- 90: thin yarn
- 92: base material
- 94: ink
- 96: thick yarn
- 98: base material
- 102: warp
- 104: weft
- 110: image
- 114: original image
- 116: printing image
- 117: output result image
- 124: bleeding-prevented image
- 126: printing image
- 127: output result image
- 142: image acquisition unit
- 144: base material information acquisition unit
- 146: bleeding prevention image processing unit
- 148: operation unit
- 150: display unit
- 152: bleeding prevention direction and range calculation function determination unit
- 154: bleeding prevention position and strength calculation processing unit
- 154A: filter processing unit
- 154B: absolute value processing unit
- 154C: addition processing unit
- 156: function database storage unit
- 160: memory
- 162: separation processing unit
- 164: difference processing unit
- 166: halftone processing unit
- 168: information output unit
- 181: central processing unit (CPU)
- 182: memory
- 183: hard disk drive
- 184: input interface unit
- 185: communication interface unit
- 186: display control unit
- 187: peripheral interface unit
- 188: bus
- 210: ink jet printing apparatus
- 214: supply-side roll
- 216: base material transportation unit 220: ink application unit
224: post-treatment unit
226: core
228: winding roll
230: transportation roller
232: nip roller pair
234: tension roller
236: core
240: printing control device
250: system control unit
252: communication unit
254: host computer
260: image processing unit
266: transportation control unit
272: ink jetting control unit
274: post-treatment control unit
280: parameter storage unit
282: program storage unit
P110: bleeding prevention image processing
P120: separation process
P122: bleeding prevention direction and range calculation function generation process
P124: bleeding prevention position and strength calculation process
P126: difference processing
P130: halftone processing
S11 to S20: step of image processing method
S51 to S54: step of printing process

What is claimed is:

1. An image processing apparatus comprising:
base material information acquisition means for acquiring base material information including at least information indicating a quality of fiber in cloth which is a medium to be printed;
image acquisition means for acquiring image data to be printed on the cloth; and
bleeding prevention image processing means for generating a bleeding-prevented image indicating an ink application pattern in which at least one of an ink application position or an amount of ink applied is limited in anticipation of wetting and spreading of the ink in the cloth, on the basis of the base material information and the image data,
wherein the base material information includes weave type information indicating the type of weave and thickness information indicating a thickness of a yarn,
wherein the bleeding prevention image processing means includes:
function determination means for determining a function used to calculate a bleeding prevention direction and a bleeding prevention range in which the application of the ink is limited on the basis of the base material information; and
arithmetic processing means for applying the function determined by the function determination means to the image data to calculate a bleeding prevention position and bleeding prevention strength corresponding to the image data.

2. The image processing apparatus according to claim 1, wherein the base material information includes yarn type information for specifying a quality of warp and weft as the information indicating the quality of the fiber.

3. The image processing apparatus according to claim 1, further comprising:
operation means for receiving an operation of inputting the base material information from a user; and
display means for displaying the base material information.

4. The image processing apparatus according to claim 1, wherein the bleeding prevention image processing means includes difference processing means for calculating a difference between an image for preventing bleeding which indicates the bleeding prevention position and the bleeding prevention strength calculated by the arithmetic processing means and an original image indicated by the image data.

5. The image processing apparatus according to claim 4, wherein the bleeding prevention image processing means includes separation processing means for performing a separation process of decomposing the image data into separated images which are images of each color component,
the arithmetic processing means generates the image for preventing bleeding which indicates the bleeding prevention position and bleeding prevention strength corresponding to the separated images by applying the function determined by the function determination means to the separated images to convert the separated images, and
the difference processing means calculates a difference between the separated images as the original image and the image for preventing bleeding to generate the bleeding-prevented image.

6. The image processing apparatus according to claim 1, wherein wetting and spreading information indicating wetting and spreading characteristics of the ink in each of a plurality of types of cloth is stored for the plurality of types of cloth in advance, and
the function determination means determines the function using the wetting and spreading information corresponding to the base material information.

7. The image processing apparatus according to claim 6, wherein the wetting and spreading information includes information indicating a wetting and spreading direction and a wetting and spreading range.

8. The image processing apparatus according to claim 6, further comprising:
function database storage means for storing, as the wetting and spreading information, data of the function corresponding to the wetting and spreading characteristics of the ink in each of a plurality of types of cloth for the plurality of types of cloth in advance,
wherein the function determination means determines the function corresponding to the base material information, using the data stored in the function database storage means.

9. The image processing apparatus according to claim 1, wherein the function determination means generates an edge enhancement filter having direction dependence as the function.

10. The image processing apparatus according to claim 9, wherein the function determination means generates, as the function, a first direction filter which is an edge enhancement filter acting in an image direction parallel to a first direction and a second direction filter which is an edge enhancement filter acting in an image direction parallel to a second direction that is perpendicular to the first direction.

11. The image processing apparatus according to claim 10,
wherein the arithmetic processing means includes:
filter processing means for performing filter processing using the function determined by the function determination means;
absolute value processing means for performing absolute value processing for calculating an absolute value of an image signal value obtained by the filter processing; and
addition processing means for adding an image for preventing bleeding in the first direction which is generated by performing the absolute value processing for a result of the filter processing using the first direction filter and an image for preventing bleeding in the second direction which is generated by performing the absolute value processing for a result of the filter processing using the second direction filter.

12. The image processing apparatus according to claim 1, further comprising:
halftone processing means for generating a dot pattern image which defines the ink application position and the amount of ink applied from the bleeding-prevented image.

13. An ink jet printing system comprising:
the image processing apparatus according to claim 1;
ink jetting means for jetting the ink and applying the ink to the ink application position determined from the bleeding-prevented image in the cloth; and
control means for controlling the ink jetting means.

14. An image processing method comprising:
a base material information acquisition step of acquiring base material information including at least information indicating a quality of fiber in cloth which is a medium to be printed;
an image acquisition step of acquiring image data to be printed on the cloth; and
a bleeding prevention image processing step of generating a bleeding-prevented image indicating an ink application pattern in which at least one of an ink application position or an amount of ink applied is limited in anticipation of wetting and spreading of the ink in the cloth, on the basis of the base material information and the image data,
wherein the base material information includes weave type information indicating the type of weave and thickness information indicating a thickness of a yarn,
wherein the bleeding prevention image processing step includes:
a function determination step of determining a function used to calculate a bleeding prevention direction and a bleeding prevention range in which the application of the ink is limited on the basis of the base material information; and
an arithmetic processing step of applying the function determined by the function determination step to the image data to calculate a bleeding prevention position and bleeding prevention strength corresponding to the image data.

15. A non-transitory computer-readable tangible medium storing a program that causes a computer to function as:
base material information acquisition means for acquiring base material information including at least information indicating a quality of fiber in cloth which is a medium to be printed;
image acquisition means for acquiring image data to be printed on the cloth; and
bleeding prevention image processing means for generating a bleeding-prevented image indicating an ink application pattern in which at least one of an ink application position or an amount of ink applied is limited in anticipation of wetting and spreading of the ink in the cloth, on the basis of the base material information and the image data,
wherein the base material information includes weave type information indicating the type of weave and thickness information indicating a thickness of a yarn,
wherein the bleeding prevention image processing means includes:
function determination means for determining a function used to calculate a bleeding prevention direction and a bleeding prevention range in which the application of the ink is limited on the basis of the base material information; and
arithmetic processing means for applying the function determined by the function determination means to the image data to calculate a bleeding prevention position and bleeding prevention strength corresponding to the image data.

* * * * *